US012291903B2

(12) United States Patent
Yu et al.

(10) Patent No.: US 12,291,903 B2
(45) Date of Patent: May 6, 2025

(54) DEADBOLT LOCK SYSTEM

(71) Applicant: ASSA ABLOY Residential Group, Inc., New Haven, CT (US)

(72) Inventors: Darius Yu, Fremont, CA (US); Aaron Treger, Pinole, CA (US)

(73) Assignee: ASSA ABLOY RESIDENTIAL GROUP, INC., New Haven, CT (US)

( * ) Notice: Subject to any disclaimer, the term of this patent is extended or adjusted under 35 U.S.C. 154(b) by 140 days.

(21) Appl. No.: 18/084,627

(22) Filed: Dec. 20, 2022

(65) Prior Publication Data

US 2023/0193655 A1 Jun. 22, 2023

Related U.S. Application Data

(60) Provisional application No. 63/291,881, filed on Dec. 20, 2021.

(51) Int. Cl.

| | |
|---|---|
| ***E05B 9/08*** | (2006.01) |
| ***E05B 9/00*** | (2006.01) |
| ***E05B 17/00*** | (2006.01) |
| ***E05B 47/02*** | (2006.01) |
| *E05B 47/00* | (2006.01) |

(52) U.S. Cl.
CPC ................ *E05B 9/08* (2013.01); *E05B 9/002* (2013.01); *E05B 17/00* (2013.01); *E05B 47/02* (2013.01); *E05B 2009/004* (2013.01); *E05B 47/0012* (2013.01); *E05B 2047/0058* (2013.01)

(58) Field of Classification Search
CPC ... E05B 9/002; E05B 9/02; E05B 9/08; E05B 15/10; E05B 2009/004; E05B 2047/0091; E05B 47/02; E05B 47/0012; E05B 63/0056; E05B 3/00; E05B 3/04; E05B 3/06
See application file for complete search history.

(56) References Cited

U.S. PATENT DOCUMENTS

| | | | | |
|---|---|---|---|---|
| 2,423,206 A * | 7/1947 | Schlage | E05B 15/02 292/357 |
| 3,249,915 A | 5/1966 | Koerner | |
| 4,849,749 A | 7/1989 | Fukamachi et al. | |
| 4,869,086 A | 9/1989 | Richards | |
| D316,365 S | 4/1991 | Hansen et al. | |
| D361,985 S | 9/1995 | Snyder | |
| 5,841,361 A | 11/1998 | Hoffman | |
| 5,960,517 A * | 10/1999 | Sprekeler | E05B 3/065 292/357 |

(Continued)

OTHER PUBLICATIONS

Abueshsheikh et al., Multi orientation door lock. Co-pending U.S. Appl. No. 17/474,250, filed Sep. 14, 2021.

(Continued)

*Primary Examiner* — Christopher J Boswell
(74) *Attorney, Agent, or Firm* — Calfee, Halter & Griswold LLP

(57) ABSTRACT

Door lock systems and related methods of use are provided. A motor of a door lock system may be placed against a surface of a housing and a bracket may be placed between the motor and a wall of the housing. The motor may be secured in the housing by moving the bracket against the wall of the housing to retain the bracket and apply a force to the motor. A door lock system may include a mounting bracket configured to receive a housing of the door lock system and secure the door housing to an associated door.

18 Claims, 37 Drawing Sheets

(56) References Cited

U.S. PATENT DOCUMENTS

| | | | |
|---|---|---|---|
| 6,032,500 A | 3/2000 | Collard, Jr. et al. | |
| D437,771 S | 2/2001 | Barnes et al. | |
| D456,689 S | 5/2002 | Nakamaru | |
| 6,472,993 B1 | 10/2002 | Addy | |
| 6,584,818 B2 * | 7/2003 | Bates | E05B 47/0607 70/432 |
| D507,171 S | 7/2005 | Sykes | |
| D559,077 S | 1/2008 | Samhammer et al. | |
| D576,019 S | 9/2008 | Kim | |
| D578,375 S | 10/2008 | Samhammer et al. | |
| 7,872,577 B2 | 1/2011 | Frolov | |
| 8,235,431 B2 * | 8/2012 | Williamson | E05B 63/0065 292/357 |
| D682,656 S | 5/2013 | Cramer et al. | |
| D683,205 S | 5/2013 | Cramer et al. | |
| 8,689,594 B2 | 4/2014 | Yanar et al. | |
| D733,522 S | 7/2015 | Kim et al. | |
| D755,605 S | 5/2016 | Kraus et al. | |
| D764,461 S | 8/2016 | Romanoff et al. | |
| D764,462 S | 8/2016 | Romanoff et al. | |
| D764,463 S | 8/2016 | Dwivedula et al. | |
| D768,463 S | 10/2016 | Kraus et al. | |
| D778,138 S | 2/2017 | Meyerhoffer | |
| D779,302 S | 2/2017 | Lizotte | |
| D779,305 S | 2/2017 | Ku | |
| D786,653 S | 5/2017 | Oliva Camacho et al. | |
| 9,644,398 B1 | 5/2017 | Cheng et al. | |
| D790,950 S | 7/2017 | Kraus et al. | |
| D795,041 S | 8/2017 | Oliva Camacho et al. | |
| D795,109 S | 8/2017 | Olodort et al. | |
| 10,017,963 B2 | 7/2018 | Johnson et al. | |
| 10,140,828 B2 | 11/2018 | Johnson et al. | |
| 10,181,232 B2 | 1/2019 | Cheng et al. | |
| 10,198,884 B2 | 2/2019 | Johnson | |
| D848,891 S | 5/2019 | Paredes | |
| 10,344,501 B2 | 7/2019 | Chang | |
| D867,104 S | 11/2019 | Morstatt et al. | |
| D887,248 S | 6/2020 | Laurans et al. | |
| D897,879 S | 10/2020 | Yang | |
| D906,086 S | 12/2020 | Qinggui | |
| D906,783 S | 1/2021 | Jung et al. | |
| 10,920,450 B2 * | 2/2021 | Horiuchi | E05B 3/065 |
| D912,492 S | 3/2021 | Singh et al. | |
| 10,970,983 B2 | 4/2021 | Johnson et al. | |
| D922,967 S | 6/2021 | Altonen et al. | |
| 11,043,055 B2 | 6/2021 | Johnson et al. | |
| D937,656 S | 12/2021 | He | |
| D942,958 S | 2/2022 | Maier et al. | |
| D959,954 S | 8/2022 | He | |
| 11,417,182 B2 | 8/2022 | Shamai | |
| 11,527,121 B2 | 12/2022 | Johnson et al. | |
| D976,733 S | 1/2023 | Li et al. | |
| D980,040 S | 3/2023 | Lovejoy et al. | |
| D985,360 S | 5/2023 | Dai | |
| 11,744,413 B2 * | 9/2023 | Lang | E05B 63/0065 222/181.1 |
| 11,892,120 B2 * | 2/2024 | Bacon-Brown | E05B 65/0075 |
| 2003/0160681 A1 | 8/2003 | Menard et al. | |
| 2003/0167693 A1 | 9/2003 | Mainini | |
| 2003/0209043 A1 * | 11/2003 | Yeh | E05B 47/0012 70/280 |
| 2004/0237609 A1 | 12/2004 | Hosselet | |
| 2005/0007451 A1 | 1/2005 | Chiang | |
| 2005/0179517 A1 | 8/2005 | Harms et al. | |
| 2006/0283219 A1 | 12/2006 | Bendz et al. | |
| 2007/0026297 A1 * | 2/2007 | Qin | H01M 50/247 429/97 |
| 2007/0056338 A1 | 3/2007 | Sabo et al. | |
| 2008/0011032 A1 | 1/2008 | Groff | |
| 2009/0167488 A1 | 7/2009 | Hays et al. | |
| 2009/0193859 A1 | 8/2009 | Kwon et al. | |
| 2011/0043362 A1 | 2/2011 | Reibel | |
| 2011/0265528 A1 | 11/2011 | Saari | |
| 2012/0089258 A1 | 4/2012 | Wong et al. | |
| 2012/0280783 A1 | 11/2012 | Gerhardt et al. | |
| 2012/0280789 A1 | 11/2012 | Gerhardt et al. | |
| 2013/0067969 A1 | 3/2013 | Webb et al. | |
| 2013/0237193 A1 | 9/2013 | Dumas et al. | |
| 2013/0265162 A1 | 10/2013 | Buckley et al. | |
| 2013/0271261 A1 | 10/2013 | Ribas et al. | |
| 2013/0340491 A1 | 12/2013 | Lambrou et al. | |
| 2014/0047878 A1 | 2/2014 | Zheng et al. | |
| 2014/0062466 A1 | 3/2014 | Thibault et al. | |
| 2014/0239647 A1 | 8/2014 | Jadallah et al. | |
| 2014/0265359 A1 | 9/2014 | Cheng et al. | |
| 2015/0027178 A1 | 1/2015 | Scalisi | |
| 2015/0102609 A1 | 4/2015 | Johnson et al. | |
| 2015/0102610 A1 | 4/2015 | Johnson et al. | |
| 2016/0040452 A1 | 2/2016 | Ku | |
| 2016/0047145 A1 | 2/2016 | Johnson et al. | |
| 2016/0134932 A1 | 5/2016 | Karp et al. | |
| 2016/0189511 A1 | 6/2016 | Peterson et al. | |
| 2016/0225240 A1 | 8/2016 | Voddhi et al. | |
| 2016/0290009 A1 | 10/2016 | Feirer et al. | |
| 2016/0291966 A1 | 10/2016 | Johnson | |
| 2016/0348398 A1 | 12/2016 | Telljohann et al. | |
| 2017/0002586 A1 | 1/2017 | Lee | |
| 2017/0193724 A1 | 7/2017 | Johnson et al. | |
| 2017/0198496 A1 | 7/2017 | Beck | |
| 2018/0038159 A1 | 2/2018 | Kincaid et al. | |
| 2018/0040183 A1 | 2/2018 | Cheng et al. | |
| 2019/0040653 A1 | 2/2019 | Baumgarte et al. | |
| 2020/0011088 A1 | 1/2020 | Harris | |
| 2020/0105124 A1 | 4/2020 | Nichols, Sr. et al. | |
| 2020/0279446 A1 | 9/2020 | Hage et al. | |
| 2021/0005036 A1 | 1/2021 | Johnson et al. | |
| 2021/0383663 A1 | 12/2021 | Shamai | |
| 2022/0058904 A1 | 2/2022 | Ross et al. | |
| 2022/0101672 A1 | 3/2022 | Abueshsheikh et al. | |
| 2022/0101706 A1 | 3/2022 | Abueshsheikh et al. | |
| 2023/0212882 A1 * | 7/2023 | Maiga | E05B 47/0603 70/279.1 |

OTHER PUBLICATIONS

Abueshsheikh et al., Door lock with magnetometers. Co-pending U.S. Appl. No. 17/475,108, filed Sep. 14, 2021.

Treger et al., Lock. Co-pending U.S. Appl. No. 29/820,190, filed Dec. 20, 2021.

Treger et al., Lock. Co-pending U.S. Appl. No. 29/820,195, filed Dec. 20, 2021.

[No Author Listed] How to install the Yale Linus Smart Lock on a compatible cylinder! YouTube. https://www.youtube.com/watch?v=Q0lRuUj9D4s. Oct. 21, 2020, 2 pages.

Ratcliffe, Yale Linus Review—HomeKit enabled smart lock. HomeKitAuthority. https://www.homekitauthority.com/yale-linus-review-homekit-enabled-smart-lock/. Mar. 11, 2021, 12 pages.

* cited by examiner

DEADBOLT LOCK SYSTEM

RELATED APPLICATIONS

This application claims the benefit under 35 U.S.C. § 119(e) to U.S. Provisional Application No. 63/291,881, filed on Dec. 20, 2021, which is herein incorporated by reference in its entirety.

FIELD

Disclosed embodiments are related to deadbolt lock systems and related methods of use. Some disclosed embodiments relate to a mounting bracket for a door lock system, which may allow the door lock system to be easily attached to and/or removed from a door. Some disclosed embodiments relate to a bracket for a door lock system configured to allow a motor to be secured within the door lock system in a toolless manner.

BACKGROUND

Deadbolt locks may be used to secure doors to prevent unauthorized entry. Some deadbolt locks can be operated manually by a knob, thumb-turn, or other handle mounted on a secured side of the door, and by a key on an unsecured side of the door. For such deadbolt locks, rotation of the handle retracts or extends a deadbolt into or out of the door. Some deadbolts may be electromechanically actuatable in addition to being manually actuatable. Such electromechanical deadbolts may include a motor that may extend or retract the bolt.

SUMMARY

In some embodiments, a bracket for a motor may include a base which has first side for engaging the motor and a second side for engaging a housing of a door lock system. The bracket also may have at least one shelf that extends from the first side of the base to engage the motor. At least one retainer may be formed in the base to engage with at least one protrusion of the housing to attach the bracket to the housing.

In other embodiments, a method of manufacturing a door lock system may include placing a motor against a surface of a housing, placing a base of a bracket between the motor and a wall of the housing, and securing the motor within the housing by moving the base against the wall of the housing to engage a retainer of the bracket with a protrusion of the housing and to apply a force to the motor in at least one direction.

In further embodiments, a door lock system may include a housing and a mounting bracket. The housing may have a first end portion, a second end portion, and a first catch positioned at the first end portion. The mounting bracket may be configured to be mounted on a surface of a door and may have a first latch movable between an engaged position and a disengaged position. The first latch may be configured to engage the first catch in the engaged position to secure the housing to the mounting bracket when the housing is moved into engagement with the mounting bracket. The mounting bracket may also have a spring configured to bias the first latch toward the engaged position.

In other embodiments, a method of assembling a door lock system may include installing a mounting bracket onto a surface of a door, the mounting bracket including at least one latch configured to move between an engaged position and a disengaged position, moving a housing into engagement with the mounting bracket, and moving the at least one latch from the disengaged position to the engaged position to engage at least one catch disposed on the housing, where engaging the at least one catch with the at least one latch secures the housing to the mounting bracket.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
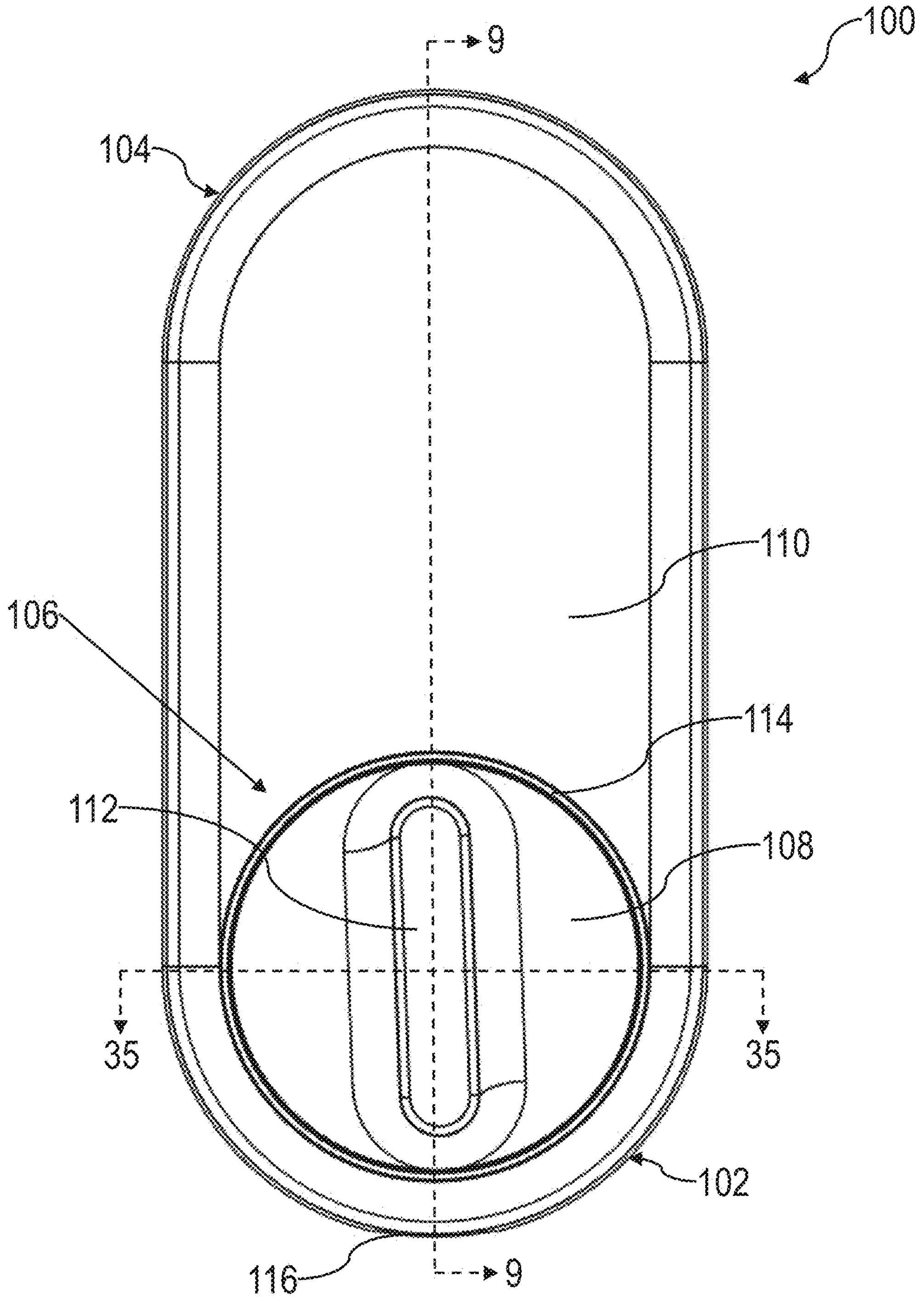
FIG. 1 is a front view of one embodiment of a door lock system.

Traditionally, doors often employ deadbolt locks (also referred to simply as deadbolts) including a bolt that moves between a retracted position and an extended position. In the retracted (e.g., unlocked) position, the bolt may be disposed at least partially within a door and, and in the extended (e.g., locked) position the bolt may extend out from the door, such as into a doorjamb of a door frame. The physical presence of the bolt extending from within the door into the door jamb inhibits the door from being opened by blocking the door from being swung out of the door frame. Such deadbolt locks may include actuators (e.g., handles) to move a bolt of the lock between the extended position and/or the retracted position.

Some conventional deadbolts are constructed using a housing and a mounting bracket. In such systems, the mounting bracket is installed on the door, and the housing is mounted onto the mounting bracket. The housing may be secured to the mounting bracket with one or more conventional fasteners (e.g., screws).

Some conventional deadbolts may be electromechanically actuatable in addition to being manually actuatable. Such electromechanical deadbolts may include an actuator such as a motor that may extend or retract the bolt, and may include a gearbox or gear assembly coupled with the motor. They may be operated using buttons on the housing that communicate with the motor to extend or retract the bolt, and/or may allow for remote operation of the lock. Remote operation can be accomplished using a wireless transceiver that may employ a radio frequency (RF) standard such as Bluetooth, Wi-Fi, or others.

Some conventional deadbolts, including electromechanical deadbolts, may be retrofitted onto an existing deadbolt lock that was in existing in place on a door. In such retrofit applications, a portion of the pre-existing deadbolt lock may be employed with a replacement deadbolt lock.

The inventors have appreciated that, in some cases, mounting a housing onto a mounting bracket may be difficult and/or time consuming. Use of conventional fasteners such as screws often requires tools which increase the difficult of mounting the housing onto the mounting bracket. Additionally, such conventional arrangements may require a user to hold a deadbolt on a door while one or more fasteners are aligned and inserted to secure the housing to the door. The inventors have also appreciated that removal of such a housing form a mounting bracket may be difficult and time consuming, as removal may involve extracting several fasteners to release the housing from the door.

In view of the above, the inventors have recognized the benefits of a door lock system that is releasably mountable onto a mounting bracket in an easy and repeatable manner. In particular, the inventors have recognized the benefits of a door lock system including one or more latches on the mounting bracket. The one or more latches of the mounting bracket may allow a user to mount the housing using a toolless process that can be achieved using a single motion (e.g., movement or application of force in a single direction). Furthermore, in some embodiments the mounting bracket latches allow for easy detachment and reattachment of the housing when access to the internals of the door lock system is required, for example, to change batteries of the door lock system.

In some embodiments, a door lock system includes a housing and a mounting bracket. The housing may include a first end portion, a second end portion, and a first catch positioned at the first end portion. In some embodiments, the first end portion and the second end portion may be opposing end portions of the housing. The catch may be a receptacle, hole, ledge, tooth, or other suitable structure configured to receive and retain a latch. The mounting bracket may be configured to be mounted on a surface of a door and may include a first latch movable between an engaged position and a disengaged position. The first latch may be configured to engage the first catch in the engaged position to secure the housing to the mounting bracket when the housing is moved into engagement with the mounting bracket. The first latch may be a protrusion, pin, pawl, or other suitable structure configured to engage a catch to retain the first latch in a position relative to the catch. In some embodiments, the mounting bracket may also include a spring configured to bias the first latch toward the engaged position. The mounting bracket may be configured to receive the door lock system while the mounting bracket is disposed on the door. When the housing engages the mounting bracket, the first latch may engage the first latch to secure the housing to the mounting bracket.

In some embodiments, a method of assembling a door lock system includes installing a mounting bracket onto a surface of a door, where the mounting bracket includes at least one latch configured to move between an engaged position and a disengaged position, moving a housing into engagement with the mounting bracket, and moving the at least one latch from the disengaged position to the engaged position to engage at least one catch disposed on the housing, where engaging the at least one catch with the at least one latch secures the housing to the mounting bracket. A housing may include a first end portion, a second end portion, and a first catch positioned at the first end portion. In some embodiments, the first end portion and the second end portion may be opposing end portions of the housing. A latch may be configured to engage the first catch in the engaged position to secure the housing to the mounting bracket when the housing is moved into engagement with the mounting bracket. The at least one latch may be a protrusion, pin, pawl, or other suitable structure configured to engage a catch to retain the first latch in a position relative to the catch. The mounting bracket may be configured to be mounted on a surface of a door and may include at least one latch movable between an engaged position and a disengaged position. A catch may be a receptacle, hole, ledge, tooth, or other suitable structure configured to receive and retain a latch.

In addition to the above, the inventors have appreciated that in conventional electrified deadbolt locks, the mass of components disposed on or in a housing results in a deadbolt lock with considerable bulk. For example, a motor, related gears or gearboxes, latches, wireless transceiver, any power source such as a battery, and other components all contribute to the considerable overall size and dimensions of the lock system.

In view of the above, the inventors have recognized the benefits of a door lock system that utilizes a bracket to secure the motor within the housing in a compact manner. The use of a bracket may allow the motor to be installed (e.g., from an uninstalled position) in areas that allow for more efficient use of the space within the housing, resulting in a reduction of the overall dimensions of the housing, for example, a thickness of the housing. For example, in arrangements that include a gear assembly, the motor bracket may secure the motor in a small space created within a footprint or dimension defined by the gear assembly, such that the motor does not contribute significantly to the dimensions of the door lock system beyond what the gear assembly contributes. For example, in some embodiments, a surface of the motor that is furthest from the door may be closer to the door than a surface of the gear assembly that is furthest from the door, such that the motor does not increase a thickness of the door lock system measured from the door to a front face of the door lock system. In some such cases, the motor may be installed within a depth defined by the gear assembly, resulting in a thinner overall door lock system as measured perpendicular from an associated door. Such a motor bracket may also provide benefits and efficiencies during manufacturing of a door lock system, in that it allows for a simple, repeatable process for securing the motor. In some cases, the bracket may allow for toolless assembly of the door lock system.

In some embodiments, a bracket for a motor includes a base which has first side for engaging a motor and a second side for engaging a housing of a door lock system. In some embodiments the base may be a planar body. The bracket also has at least one shelf that extends from the first side of the base to engage the motor. The shelf may be a wall or other protrusion extending from the first side of the base. The bracket may also include at least one retainer formed in the base to engage with at least one protrusion of the housing to attach the bracket to the housing. The at least one retainer may include a latch, deformable protrusion, and/or any other suitable retaining structure configured to engage the at least one protrusion of the housing to attach the bracket of the housing.

In some embodiments, a method of manufacturing a door lock system includes placing a motor against a surface of a housing, placing a base of a bracket between the motor and a wall of the housing, and securing the motor within the housing by moving the base against the wall of the housing to engage a retainer of the bracket with a protrusion of the housing and to apply a force to the motor in at least one direction. In some embodiments the base may be a planar body. The retainer may be formed in the base to engage with at least one protrusion of the housing to attach the bracket to the housing. The at least one retainer may include a latch, deformable protrusion, and/or any other suitable retaining structure configured to engage the at least one protrusion of the housing to attach the bracket of the housing.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 illustrates a front view of one embodiment of a door lock system 100. The door lock system 100 has a first end portion 102 and a second end portion 104. Each of the first end portion 102 and the second end portion 104 may be rounded as shown, or may have any other suitable geometry. The first end portion 102 may include a lock turn assembly which may include a handle 106. The handle 106 may have a circular portion 108 that may be aligned with a front face of a housing 110, and a thumb turn 112 that may extend from the circular portion 108. The thumb turn 112 may be grasped by a user to move an associated bolt between an extended and retracted position. In some embodiments as shown in FIG. 1, the handle 106 may be encircled by an outer ring 114. The outer ring 114 may be configured to illuminate the door lock system 100 and/or provide notifications to a user. An outer ring 114 that is configured to illuminate may be referred to as a light ring. The first end portion 102 may also include a button 116. The button 116 may be an actuation surface of a first latch of a mounting bracket, as described in further detail below.

Figure 2:
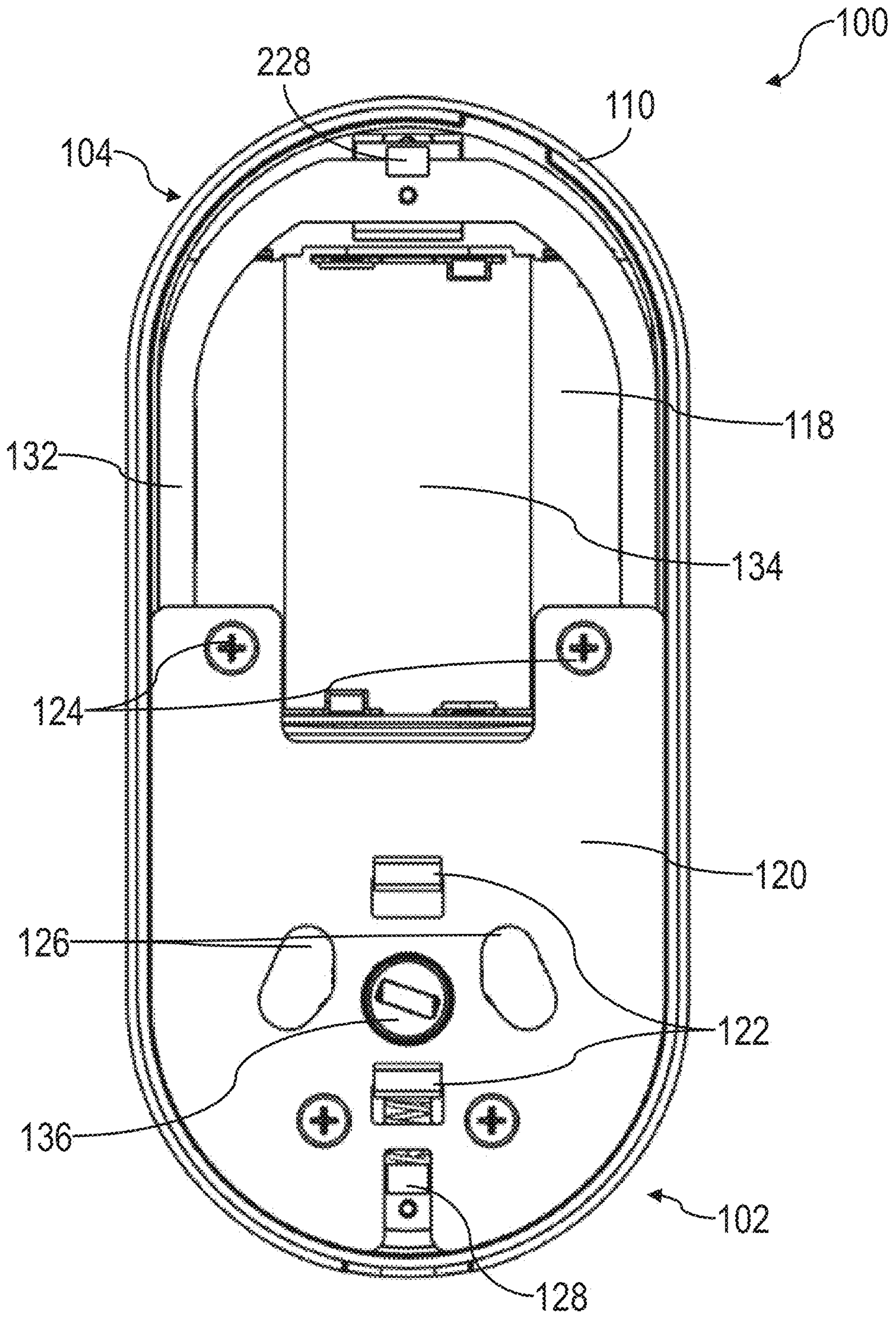
FIG. 2 is a rear view of one embodiment of a door lock system.

FIG. 2 shows a back view of the door lock system 100. As shown in FIG. 2, the door lock system 100 includes a mounting bracket 118. In some embodiments as shown in FIG. 2, the mounting bracket may be shaped to fit within an outer wall of the housing 110. In some embodiments, the mounting bracket 118 may include a back plate 120 configured provide additional structure and rigidity for installing the door lock system 100 on a door. The back plate 120 is secured to the mounting bracket 118 using clips 122 and screws 124. Of course, in other embodiments any suitable fasteners may be employed, as the present disclosure is not so limited. The back plate 120 may include mounting holes 126 for securing the mounting bracket 118 to the door or to a pre-existing deadbolt lock (e.g., via one or more fasteners such as bolts).

As shown in FIG. 2, the mounting bracket 118 may have a first latch 128 located at the first end portion of the door lock system 100 and a second latch 228 located at the second end portion of the door lock system 100. The first latch 128 and the second latch 228 may be operably linked by a rigid link 132, which may be disposed along a length of the mounting bracket 118 and at least partially disposed between the mounting bracket 118 and the back plate 120. The structure and operation of the first latch 128, the second latch 228, and the rigid link 132 will be described in further detail below with reference to FIGS. 5-12.

According to the embodiment of FIG. 2, the mounting bracket 118 may include a battery compartment 134 configured to house one or more batteries to provide power to the door lock system 100. The mounting bracket 118 may also include an adapter 136. The adapter 136 may be configured to allow the door lock system 100 to operate with a deadbolt lock set, and may be configured to allow the door lock system 100 to be retrofitted onto a pre-existing deadbolt lock. The adapter 136 may be operably coupled with a motor of the door lock system 100 (e.g., via a driveshaft) and may be configured to cooperate with elements of the pre-existing deadbolt lock to enable the motor of the door lock system 100 to extend and retract a bolt of the pre-existing deadbolt lock. For example, in some embodiments the adapter 136 may be configured to mate with a tailpiece of a pre-existing deadbolt lock. In some embodiments, the adapter 136 may be interchangeable with another adapter. In such embodiments, interchangeable adapters may allow the door lock system 100 to be universal and operate several different types of pre-existing deadbolt locks.

Figure 3:
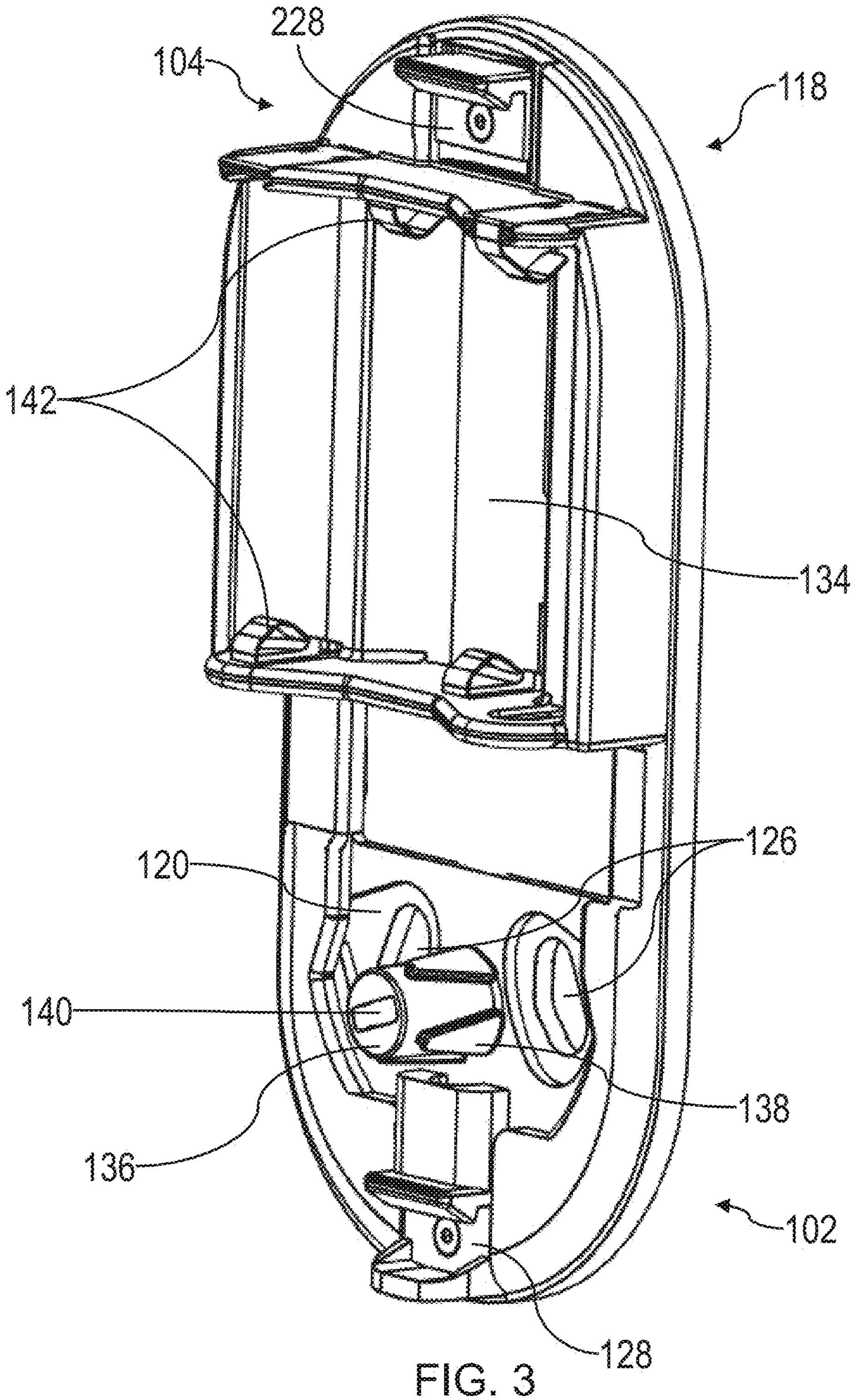
FIG. 3 is a front perspective view of a mounting bracket of one embodiment of a door lock system.

FIG. 3 shows a front perspective view of the mounting bracket 118 with the housing 110 removed. The adapter 136 may have stops 138 that allow the adapter 136 to be inserted into the mounting bracket 118 up to a predetermined depth. As shown in FIG. 3, the adapter may also include a central channel 140 configured to operatively couple the adapter to a deadbolt lock set, including a pre-existing deadbolt lock. According to the embodiment of FIG. 3, the battery compartment 134 includes a plurality of pairs of battery terminals 142 to hold a plurality of batteries. Of course, in other embodiments a battery compartment may have a single pair of battery terminals 142 to hold a single battery, or any suitable number of terminals to hold any suitable number of batteries, as the present disclosure is not so limited.

Figure 4:
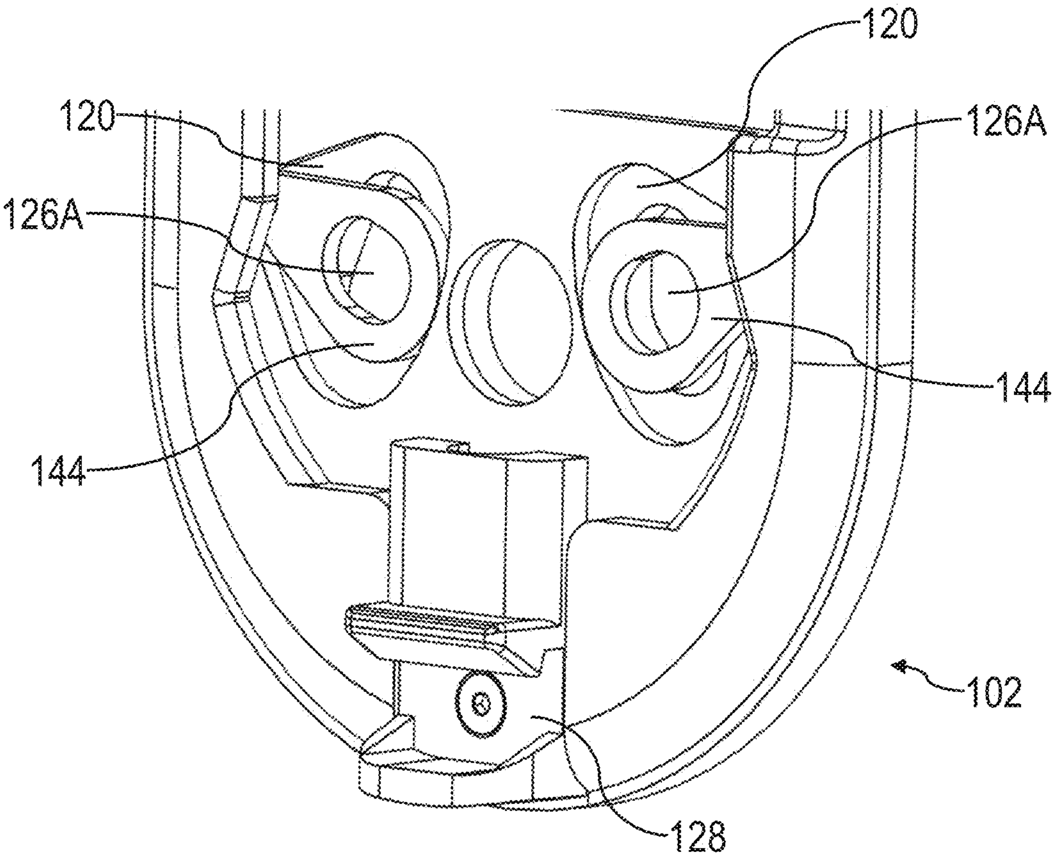
FIG. 4 is a front perspective view of a first end portion of a mounting bracket of one embodiment of a door lock system.

FIG. 4 shows a front perspective view of the mounting bracket 118 near the first end portion 102 of the door lock system 100 with the adapter 136 removed to show the back plate mounting holes 126. The mounting bracket may include an eyelet 144 installed over each of the back plate mounting holes 126 to assist in securing the mounting bracket 118 to the door. The eyelets 144 may include eyelet holes 126A configured to align with the back plate mounting holes 126. The eyelet holes 126A may be smaller than the back plate holes 126, and the eyelets 144 be configured to swivel relative to the back plate holes 126, such that the eyelet holes 126A may be aligned with associated holes of a pre-existing deadbolt lock during installation of the door lock system 100 onto a door.

Figure 5:
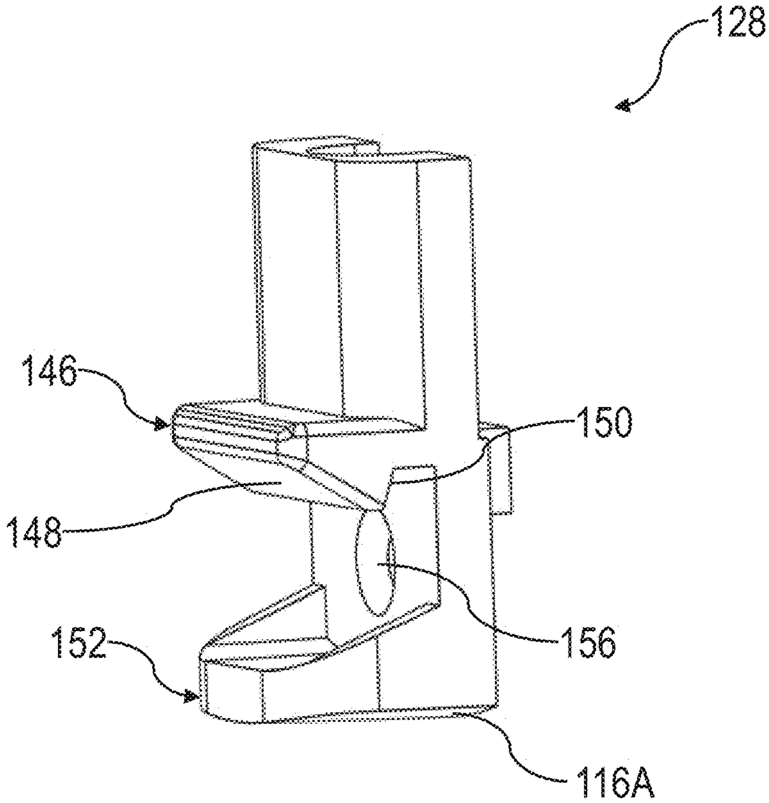
FIG. 5 is a perspective side view of a first latch of one embodiment of a door lock system.
Figure 6:
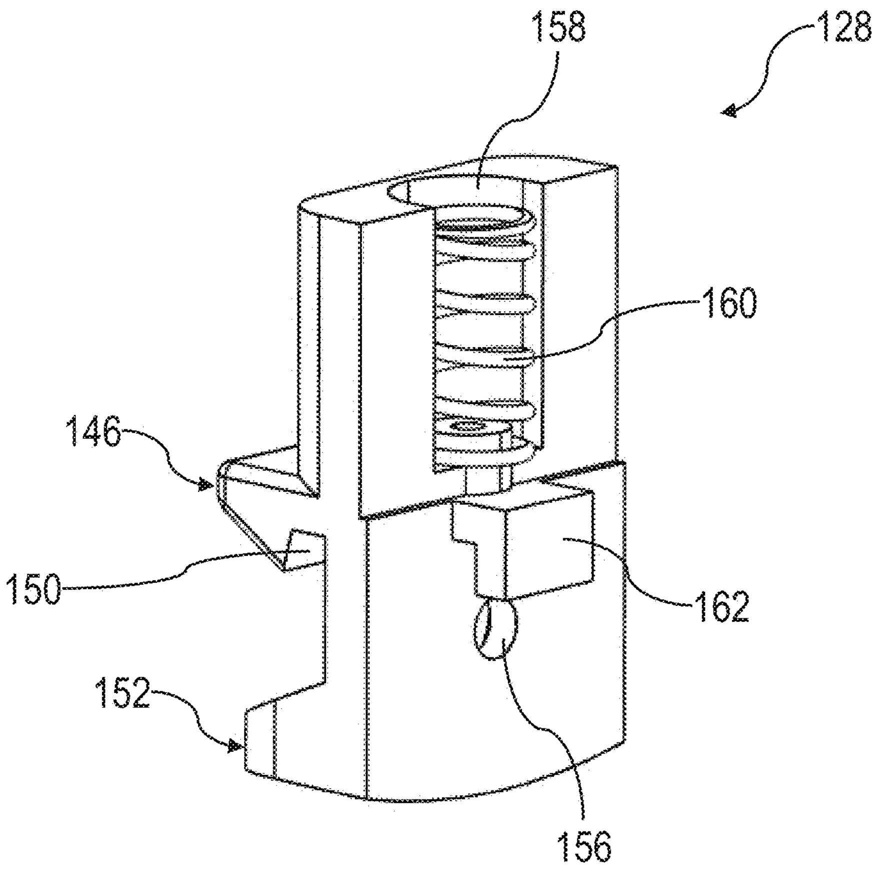
FIG. 6 is a perspective rear view of a first latch of one embodiment of a door lock system.
Figure 7:
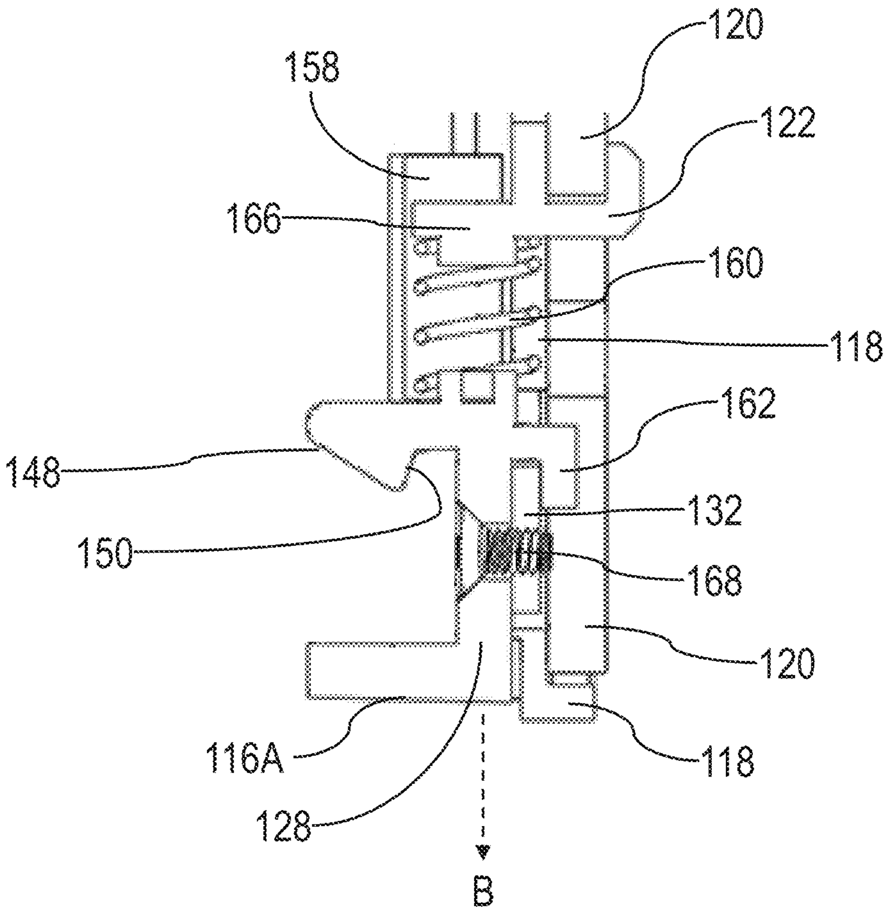
FIG. 7 is a cross-sectional view of a first end portion of a mounting bracket of one embodiment of a door lock system taken along line 9-9 of FIG. 1.

FIGS. 5-7 show one embodiment of the first latch 128. As shown in FIGS. 5-7, the first latch 128 includes a latching projection 146 extending from a first side. The latching projection 146 of the first latch includes a sloped surface 148 configured to slide against a corresponding angled surface of a first catch on the housing when moving between an engaged position and a disengaged position. In some embodiments, a sloped surface may be configured to slide against a non-correspondingly angled surface, as the present disclosure is not so limited. The latching projection 146 may also have a first latch engagement surface 150 configured to contact a catch engagement surface of the first catch when the first latch 128 is actuated to engage the first catch. The first latch engagement surface 150 may be configured to retain the first latch within the catch.

In some embodiments as shown in FIGS. 5-7, the first latch 128 also includes an actuating structure 152. The actuating structure 152 may project from the first side of the first latch 128. Of course, in other embodiments, the actuation structure may project from any side of first latch, as the present disclosure is not so limited. An actuation surface 116A of the actuating structure 152 may be accessible to a user when the door lock system 100 is installed on a door, such that a user may press the actuation surface 116A to actuate the first latch 128. Accordingly, the actuating structure 152 and the actuation surface 116A may act as a button to actuate the first latch 128 and move the first latch 128 between an engaged position and a disengaged position. However, it should be appreciated that a separate button or other actuating feature may also be used, and that the actuation surface 116A need not be integrated into an actuating structure 152. In some alternative embodiments, the actuation surface 116A may be simply a surface of the first latch 128. In other words, the actuation function of the first latch 128 may be accomplished without the additional structure provided by actuating structure 152.

As shown in FIGS. 5-6, the first latch 128 may also have a through-hole 156 formed therein. The through-hole 156 may allow a fastener such as a screw, a rivet, or other common fastener to secure the first latch 128 to the mounting bracket 118. The first latch 128 may be secured to a rigid link 132, as will be described in further detail below. The securement to the rigid link 132 may be configured such that the first latch and rigid link move together.

As shown in FIGS. 6-7, the first latch 128 includes a channel 158 formed along at least part of its length. In the depicted embodiment, the channel 158 contains a spring 160 and is open at one end. When the first latch 128 is installed in a mounting bracket 118, the spring 160 may be configured to resist actuation of the first latch 128 and to bias the first latch 128 in a single direction that may be opposite a direction of actuation. That is, the spring is configured to bias the first latch from a disengaged position towards an engaged position. In the embodiment of FIG. 7, the spring is a compression spring. However, in other embodiments, any suitable biasing member may be employed, include, but not limited to, tension springs and torsion springs, as the present disclosure is not so limited.

As shown in FIGS. 6-7, the first latch 128 also includes a hook 162 extending from a second side of the first latch (e.g., opposite the first side). In some embodiments as shown in FIGS. 6-7, the hook 162 may be disposed near the through-hole 156. The hook 162 may be configured to retain the first latch 128 against the rigid link 132 and to prevent the first latch 128 from rotating relative to the rigid link 132.

FIG. 7 shows a cross-sectional side view of the first latch 128 installed in a mounting bracket 118. The mounting bracket 118 has a back plate 120 installed thereon using a clip 122. The clip 122 may be formed as part of the mounting bracket 118, or may be a separate component attached thereto. In the embodiment shown, the clip 122 also provides a cap 166 within the channel 158. In other embodiments, the cap 166 may be a separate or stand-alone component installed in the mounting bracket 118. The cap 166 and the channel 158 of the first latch 128 cooperate to retain the spring 160 in a compressed state. In this way, the spring 160 provides a biasing force that urges the first latch 128 in the direction of arrow B. The biasing force provided by the spring 160 may urge the first latch 128 toward an engaged position.

As shown in FIG. 7, the first latch 128 is attached to the rigid link 132 by a screw 168 and a hook 162. However, it should be appreciated that a latch may be attached to a rigid link by any appropriate arrangement, including fasteners, adhesives, etc. According to the depicted embodiment, the rigid link 132 is actuated concurrently with the first latch 128. Actuation of the first latch is accomplished when a user presses the actuation surface 116A in a direction that further compresses the spring 160 (e.g., against the biasing force in a direction opposite direction B). When the user releases the actuation surface 116A, the spring 160 urges the first latch 128 back to the engaged position, which may be a resting position. Actuation of the first latch 128 may move the first latch 128 into a disengaged position, and the spring bias of the spring 160 may return the first latch 128 to the engaged position when the user has released the actuation surface 116A.

Figure 8:
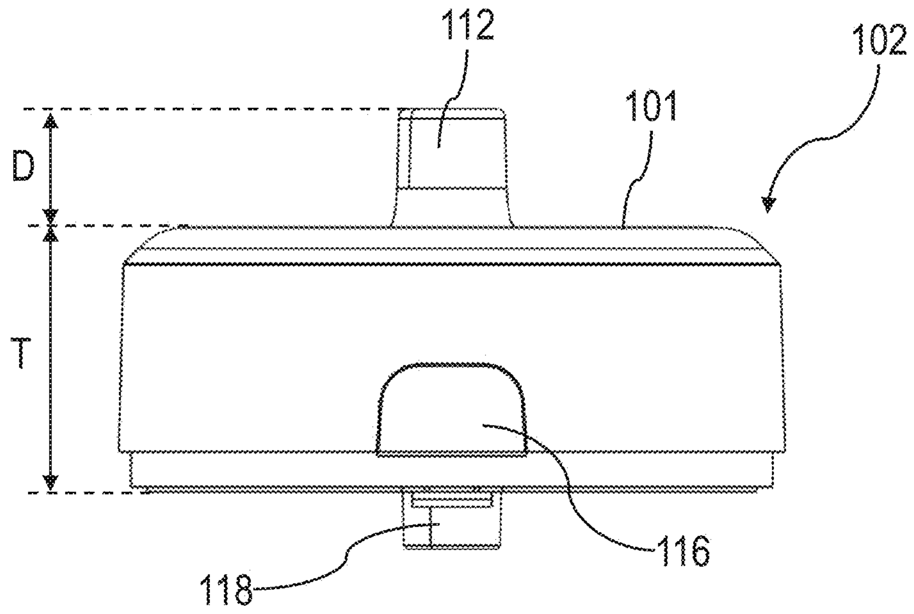
FIG. 8 is a bottom view of one embodiment of a door lock system.

FIG. 8 shows a bottom view of the first end portion 102 of a door lock system 100. The button 116 may be the actuation surface 116A of the first latch as shown in FIGS. 5-7, or it may be any other button configured to actuate the first latch 128. While the button 116 is shown having a generally rectangular geometry, the button 116 may be formed in any suitable shape. Further, while the button 116 is illustrated at a central position on the first end portion 102, the button 116 may be positioned at any suitable location on the door lock system 100. A thickness T of the door lock system 100 may be measured from a surface of a door on which the door lock system is installed to a front face 101 of the door lock system 100. A depth D of the thumb turn 112 may be measured from the front face 101 to a surface of the thumb turn 112 that is furthest from the front face 101. In some embodiments, a ratio of the thickness T to the depth D may be greater than or equal to 1.0, 1.5, 2.0, and/or any other appropriate value. Additionally, the ratio of the thickness T to the depth D may be less than or equal to 3.0, 2.5, 2.25, and/or any other appropriate value. Combinations of the foregoing are contemplated including, for example, greater than or equal to 1.0 and less than or equal to 3.0, greater than or equal to 2.0 and less than or equal 2.25, and/or any other appropriate combination of the foregoing. Of course, while particular ranges for the ratio of the thickness T to the depth D are provided above, it should be understood that other ranges both greater than and less than those noted above are also contemplated as the disclosure is not limited in this fashion.

In some embodiments, the thickness T may be greater than or equal to 15 mm, 20 mm, 25 mm and/or any other appropriate thickness. Additionally, the thickness T may be less than or equal to 40 mm, 35 mm, 30 mm, and/or any other appropriate thickness. Combinations of the foregoing are contemplated including, for example, greater than or equal to 15 mm and less than or equal to 40 mm, greater than or equal to 25 mm and less than or equal 30 mm, and/or any other appropriate combination of the foregoing.

Figure 9:
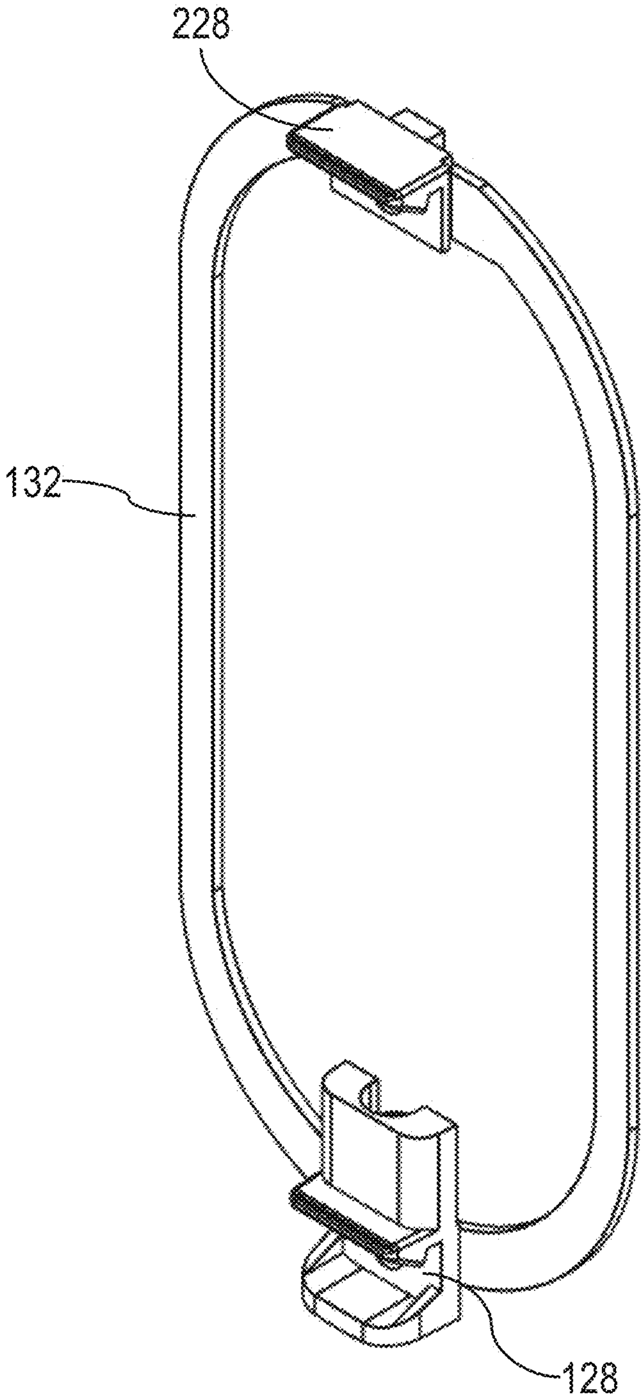
FIG. 9 is a perspective front view of a rigid link, a first latch, and a second latch of one embodiment of a door lock system.

FIG. 9 illustrates a first latch 128 connected to a rigid link 132. As shown in FIG. 9, the rigid link 132 is similarly connected to a second latch 228. That is, the second latch 228 may be connected to the rigid link with a fastener and a hook. However, it should be appreciated that a latch may be attached to a rigid link by any appropriate arrangement in other embodiments, including but not limited to, mechanical fasteners (e.g., rivets, screws, bolts) and adhesives (e.g., glue, epoxy, etc.). It should be appreciated that a rigid link may be formed of any material, including plastic or metal, having sufficient rigidity to resist deformation when transmitting a force or a motion from a first latch to a second latch in response to the first latch being moved or actuated.

Figure 10:
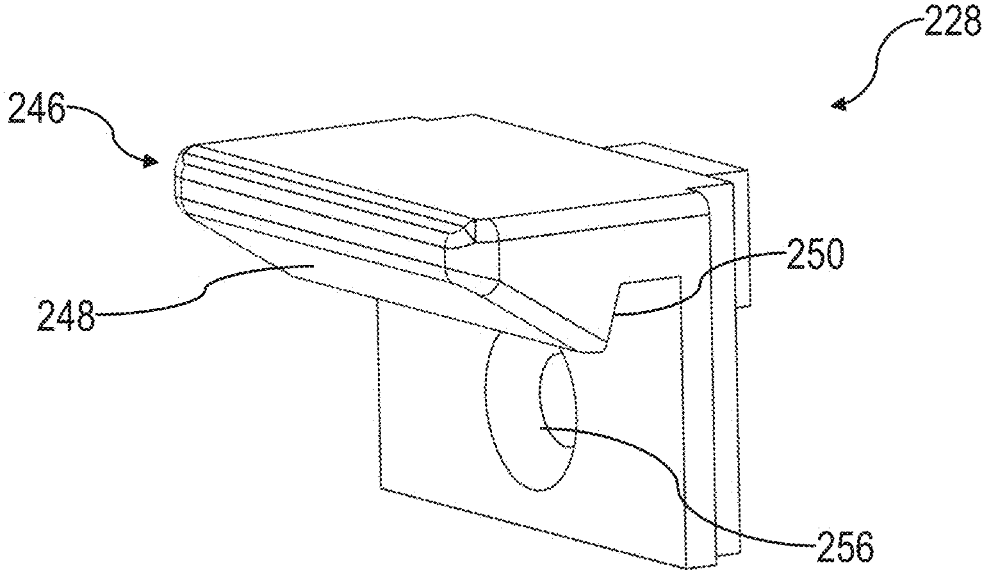
FIG. 10 is a perspective side view of a second latch of one embodiment of a door lock system.
Figure 11:
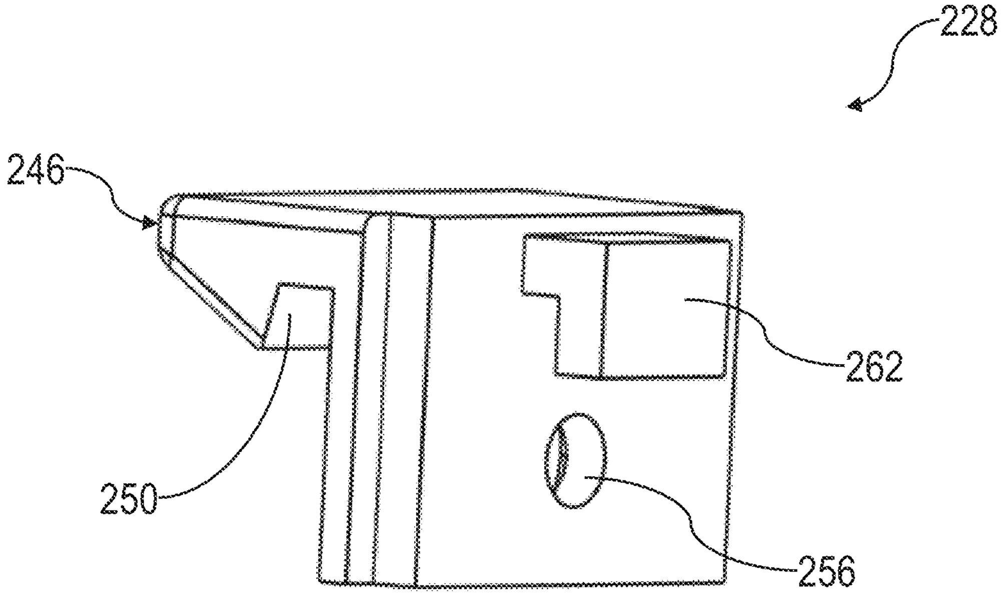
FIG. 11 is a perspective rear view of a second latch of one embodiment of a door lock system.
Figure 12:
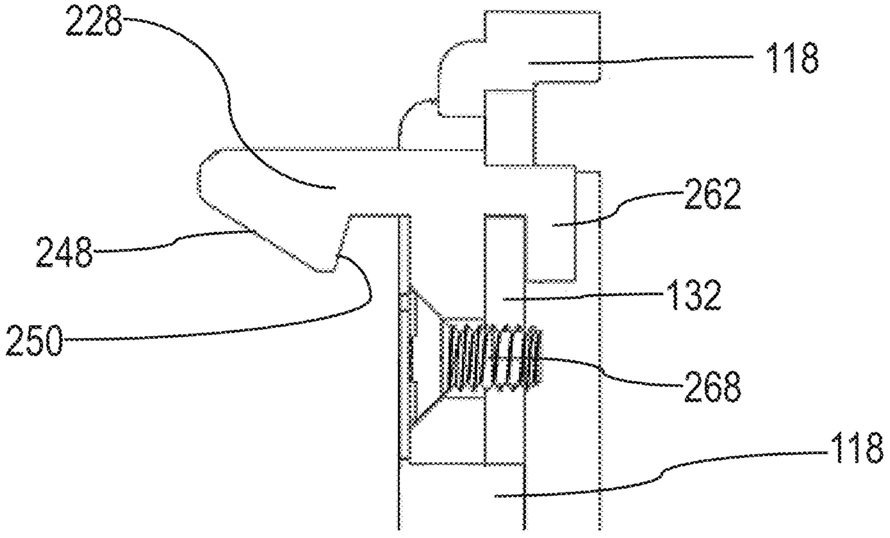
FIG. 12 is a cross-sectional view of a second end portion of a mounting bracket of one embodiment of a door lock system taken along line 9-9 of FIG. 1.

FIGS. 10-12 depict a second latch 228. The second latch 228 includes a latching projection 246 extending from a first side. The latching projection 246 of the second latch 228 includes a sloped surface 248 configured to slide against a corresponding angled surface of a second catch on the housing when moving between an engaged position and a disengaged position. In some embodiments, a sloped surface may be configured to slide against a non-correspondingly angled surface, as the present disclosure is not so limited. The latching projection 246 may also have a second latch engagement surface 250 configured to contact a catch engagement surface of the second catch when the second latch 228 is actuated to engage the second catch. The second latch may be any suitable material with appropriate rigidity and durability, including any appropriate plastic or metal materials. The second latch engagement surface 250 may be configured to retain the second latch within the catch.

As shown in FIGS. 10-11, the second latch 228 also includes a through-hole 256 formed therein. The through-hole 256 may allow a fastener such as a screw, a rivet, or other common fastener to secure the second latch 228 to the mounting bracket 118. The second latch 228 may be secured to a rigid link 132. The second latch 228 also includes a hook 262 extending from a second side of the second latch (e.g., opposite the first side). The hook 262 may be disposed near the through-hole 256. The hook 262 may be configured to retain the second latch 228 against the rigid link 132 and to prevent the second latch 228 from rotating relative to the rigid link 132. The securement to the rigid link 132 may be configured such that the second latch and rigid link move together.

A cross-sectional side view of the second latch 228 installed on a mounting bracket 118 is shown in FIG. 12. The second latch 228 is attached to the rigid link 132 by a screw 268 and a hook 262. The rigid link 132, being attached to the first latch 128 as described above, may be actuated concurrently with the first latch 128. Actuation of the rigid link 132 results in actuation of the second latch 228. The resting position of the second latch 228 may be an engaged position. Actuation of the first latch 128 may move the second latch 228 into a disengaged position via the rigid link 132. The biasing force of the spring 160 in the first latch 128 may return the second latch 228 to the engaged position via the rigid link 132 when the user has released the actuation surface 116A of the first latch 128. In this way, the rigid link is configured to bias both the first latch and the second latch toward their respective engaged positions.

Figure 13:
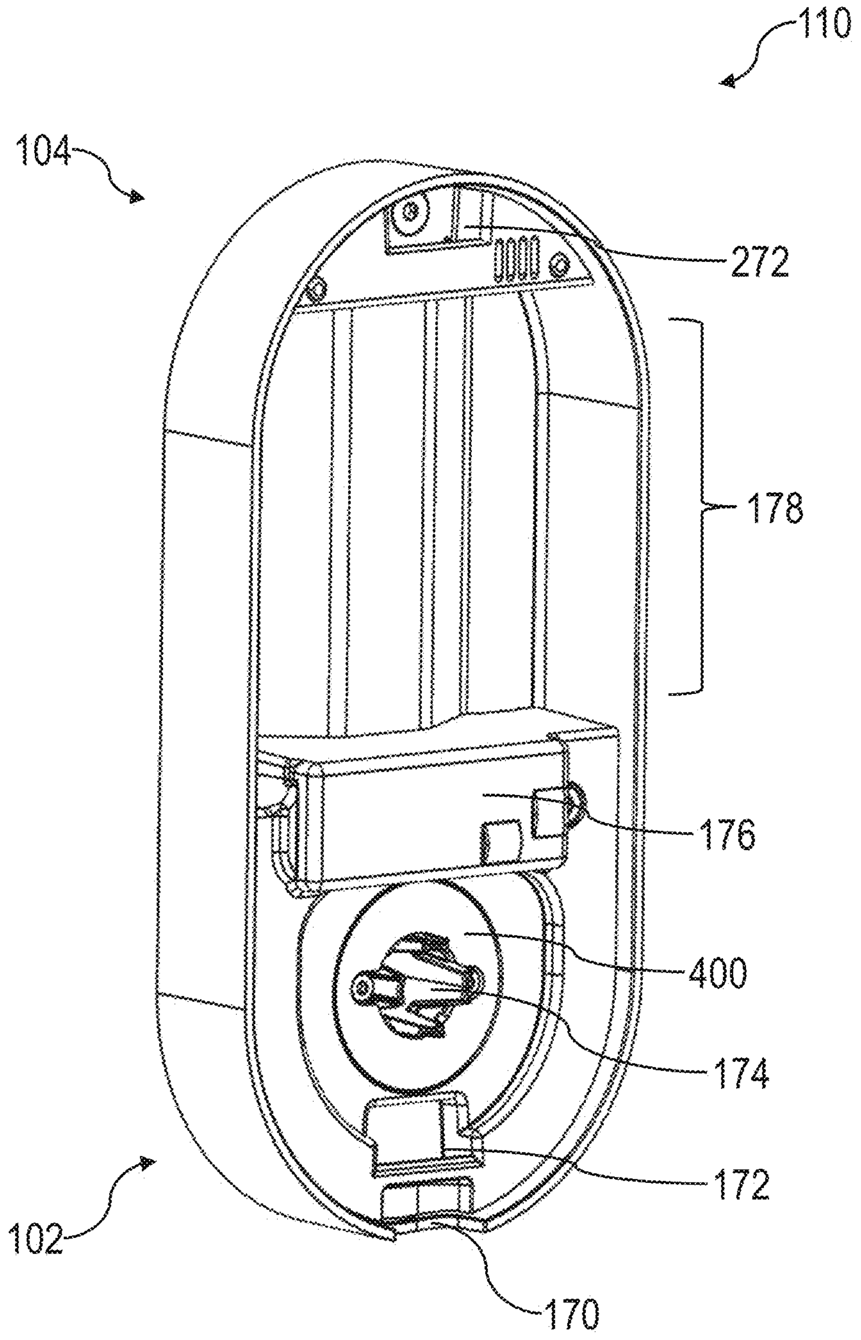
FIG. 13 is a rear perspective view of a housing of one embodiment of a door lock system.

FIG. 13 depicts a housing 110 of the door lock system depicting some of the specific components of the door lock system. At the first end portion 102 as shown in FIG. 13, the housing includes a cut-out 170 configured to accommodate the button 116 when the housing 110 is installed on the mounting bracket 118. The first end portion 102 may also include a first catch 172 configured to cooperate with the first latch 128 when the housing 110 is installed on the mounting bracket 118. The first end portion 102 may also have a lock turn assembly 400 disposed therein. The lock turn assembly 400 may include one or more adapter protrusions 174 configured to cooperate with the stops 138 of the adapter 136 to allow the adapter 136 to rotate when the lock turn assembly 400 is rotated.

As shown in FIG. 13, the housing includes a motor compartment 176. In the embodiment shown, the motor compartment 176 is disposed between the first end portion 102 and the second end portion 104. In the depicted embodiments, a recess 178 is formed in the housing 110 to accommodate the battery compartment 134 of the mounting bracket 118 when the housing 110 is installed on the mounting bracket 118.

Figure 14:
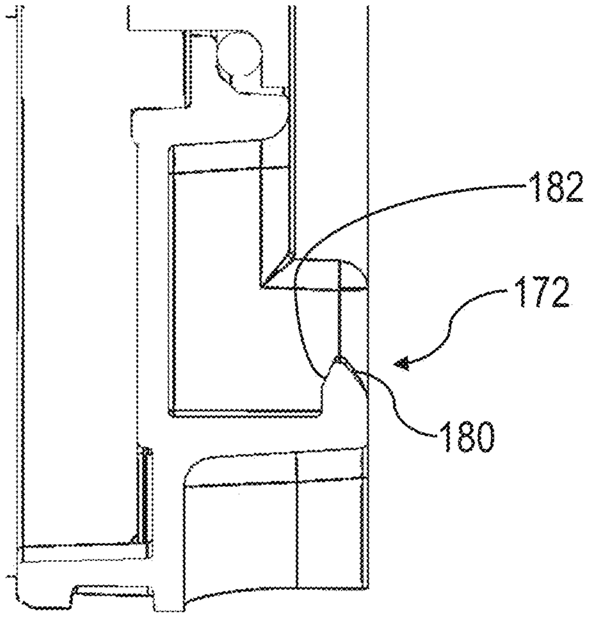
FIG. 14 is a cross-sectional view of a first end portion of a housing of one embodiment of a door lock system, taken along line 9-9 of FIG. 1.

As shown in FIG. 14, the first end portion 102 includes a first catch 172. The first catch 172 is configured to cooperate with the first latch 128 of the mounting bracket when the housing 110 is installed on the mounting bracket 118. As shown in FIGS. 13-14, the first catch may be formed as a cavity within the housing 110. The first catch may have an angled surface 180 configured to slide against a corresponding sloped surface of a first latch 128 on the mounting bracket 118 when the first latch 128 is moved to engage the second catch 172. The first catch 172 may also have a first catch engagement surface 182 configured to contact a first latch engagement surface of the first latch (for example, see FIGS. 5-7) when the first latch is moved to engage the first catch 172. The first catch engagement surface and the first latch engagement surface are configured to cooperate to secure the housing to the mounting bracket, as shown and described with reference to FIG. 15 below.

Figure 15:
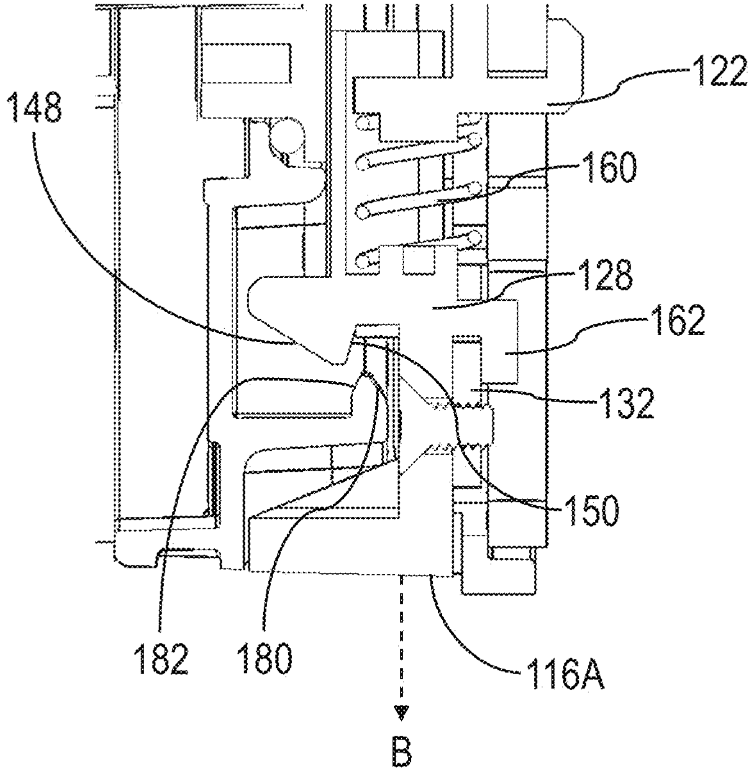
FIG. 15 is a cross-sectional view of a first end portion of one embodiment of a door lock system taken along line 9-9 of FIG. 1, with a housing secured to a mounting bracket.

Engagement of the first latch 128 with the first catch 172 is illustrated in the cross-sectional view of FIG. 15. In the state shown in FIG. 15, the first latch 128 has been actuated into a disengaged position via the actuation surface 116A. When the actuation surface 116A is released, the spring 160 will urge the first latch 128 towards an engaged position in the direction of arrow B. The first latch engagement surface 150 will be brought into contact with the first catch engagement surface 182, thereby securing the housing 110 to the mounting bracket 118. In particular, the first catch engagement surface and first latch engagement surface will inhibit the housing from being moved away from the mounting bracket, at the first catch engagement surface and first latch engagement surface abut one another.

Figure 16:
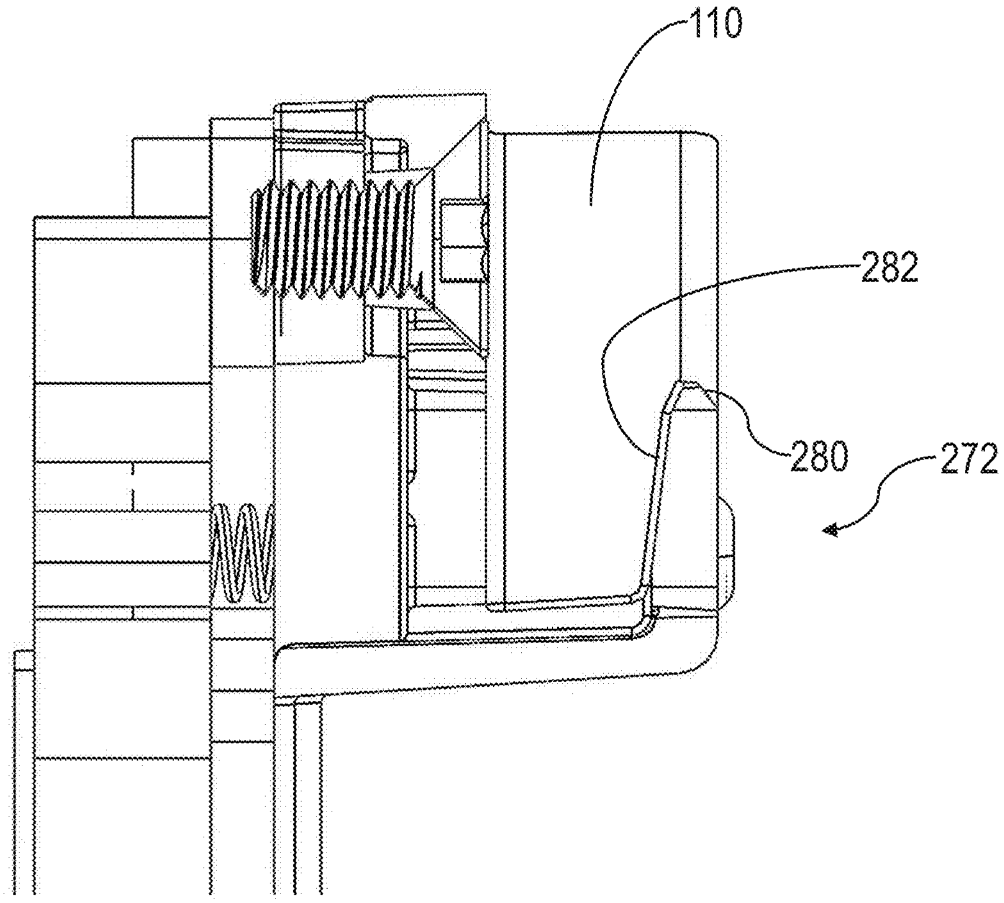
FIG. 16 is a cross-sectional view of a second end portion of a housing of one embodiment of a door lock system taken along line 9-9 of FIG. 1.
Figure 17:
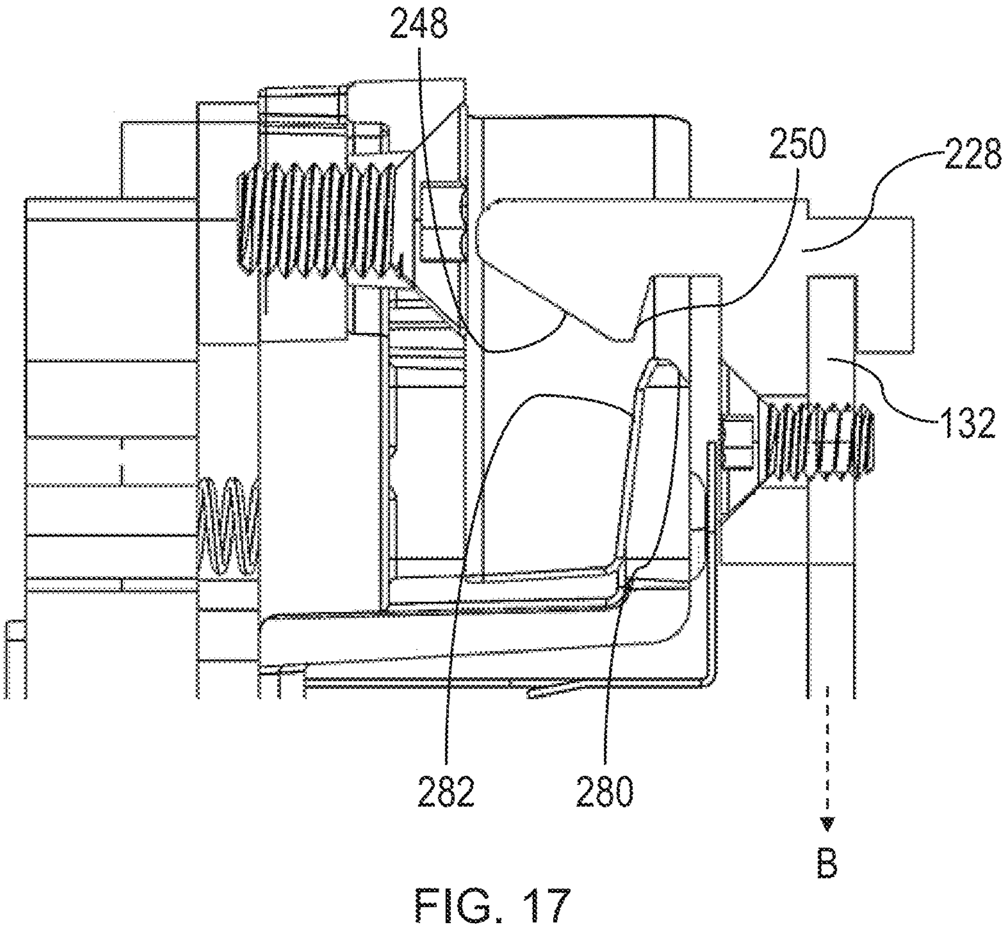
FIG. 17 is a cross-sectional view of a second end portion of one embodiment of a door lock system taken along line 9-9 of FIG. 1, with a housing secured to a mounting bracket.

Similarly, the second end portion 104 of the housing 110 may include a second catch 272 as shown in FIG. 16. The second catch 272 is configured to cooperate with the second latch of the mounting bracket when the housing 110 is installed on the mounting bracket. As shown in FIGS. 13 and 16, the second catch is formed as a cavity within the housing 110. In some embodiments as shown in FIG. 16-17, the second catch includes an angled surface 280 configured to slide against a corresponding sloped surface of a second latch 228 on the mounting bracket when the second latch engages the second catch 272 (e.g., when the housing 110 is moved in a direction toward the mounting bracket in a direction perpendicular to an associated door). As shown in FIG. 17, the second catch 272 also includes a second catch engagement surface 282 configured to contact a second latch engagement surface of the second latch when the second latch is moved to engage the second catch 272. Similarly to the first latch engagement surface and first catch engagement surface, the second latch engagement surface and second catch engagement surface are configured to secure the housing to the mounting bracket.

Engagement of the second latch 228 with the second catch 272 is illustrated in the cross-sectional view of FIG. 17. In the state of FIG. 17, the second latch 228 has been actuated into a disengaged position via the operative attachment of the rigid link 132 to the actuation surface 116A of the first latch 128. That is, movement of the first latch from an engaged position to the disengaged position correspondingly moves the second latch from an engaged position to the disengaged position. When the actuation surface 116A associated with the first latch is released, the spring 160 will urge the first latch 128 towards the engaged position, thereby urging the second latch 228 towards the engaged position in the direction of arrow B via the rigid link 132. Under the force from the spring via the rigid link 132, the second latch engagement surface 250 will be brought into contact with the second catch engagement surface 282 as the second latch moves to the engaged position, thereby securing the housing to the mounting bracket. While in the embodiment of FIGS. 16-17 the first latch may include an actuation surface and a spring, in other embodiments the second latch 228 may include an actuation surface and a spring, as the present disclosure is not so limited. In some embodiments, both a first latch and a second latch may include a spring.

During installation of the housing 110 to the mounting bracket 118, a user may not actuate the first latch 128. The first sloped surface 148 of the first latch 128 may be configured to slide against the first angled surface 180 of the first catch 172, and the second sloped surface 248 of the second latch 228 may be configured to slide against the second angled surface 280 of the second catch 272. These sliding engagements, coupled with the joint operation of the first latch 128 and the second latch 228 achieved through the rigid link 132, may allow the first angled surface 180 to move the first latch 128 into a disengaged position and may allow the second angled surface 280 to move the second latch 228 into a disengaged position by overcoming the biasing force of spring 160. When the first sloped surface 148 has moved past the first angled surface 180 and second sloped surface 248 has moved past the second angled surface 280, the spring bias of spring 160 may move the first latch 128 back into the engaged position, bringing the first latch engagement surface 150 into contact with the first catch engagement surface 182 and bringing the second latch engagement surface 250 into contact with the second catch engagement surface 282. This configuration of a latch and a catch, as well as the resulting actuation and engagement process, may allow a user to move the housing into engagement with the mounting bracket in a direction that is perpendicular to a surface of a door on which the mounting bracket may be installed. That is, the user may move the housing in a single direction (e.g., toward the mounting bracket) without taking any other action to secure the housing to the mounting bracket with the latches and catches.

Removal of the housing 110 from the mounting bracket 118 may be achieved by actuating the actuation surface 116A to move the first latch 128 and the second latch 228 into the disengaged position. In some embodiments, and as shown in FIGS. 18-22, the housing may include ejection springs configured to bias the housing 110 away from the mounting bracket 118. When the first latch 128 and the second latch 228 are in the disengaged position, the ejection springs may urge the housing 110 away from the mounting bracket 118 to assist a user in removing the housing 110.

Figure 18:
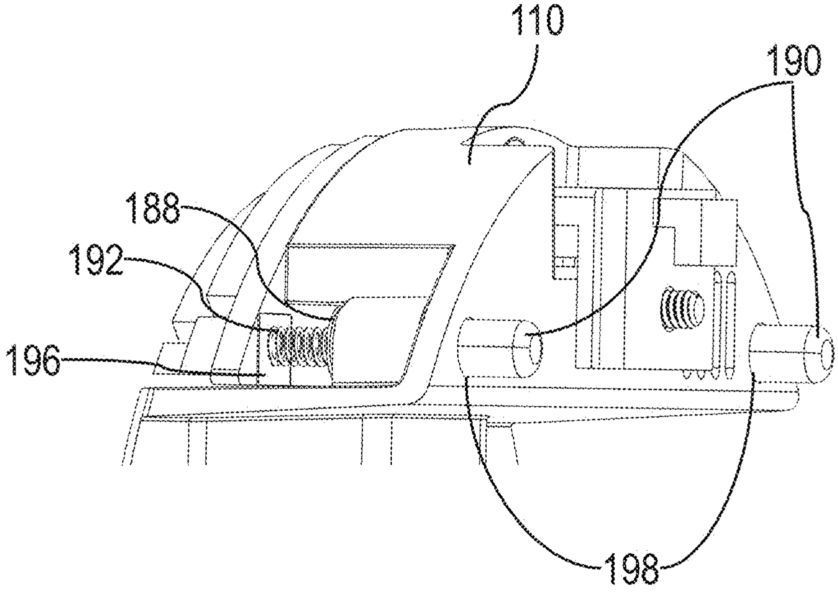
FIG. 18 is a rear perspective view of a second end portion of a first embodiment of a door lock system with outer structures removed.
Figure 19:
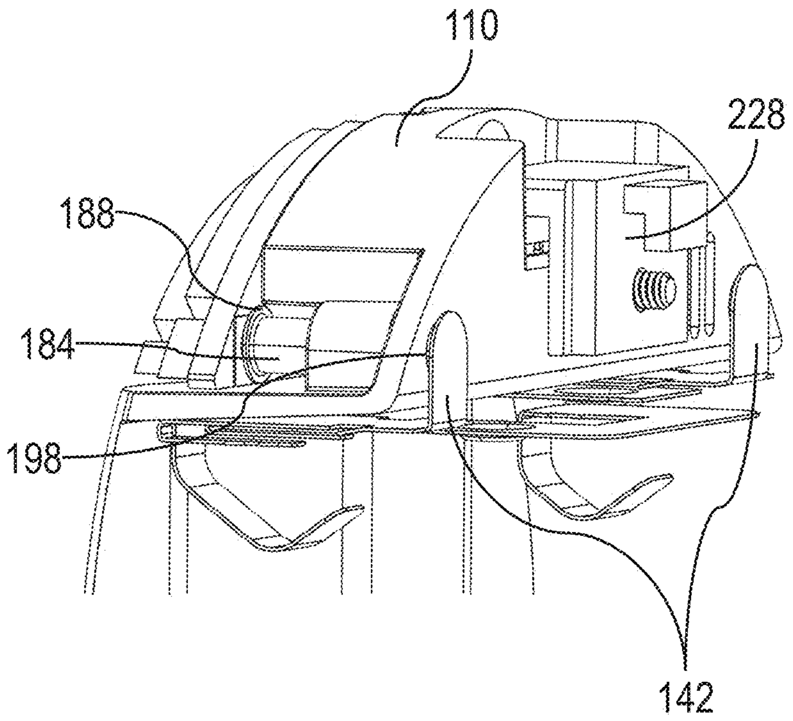
FIG. 19 is a rear perspective view of a second end portion of a first embodiment of a door lock system with a housing secured to a mounting bracket and with outer structures removed.

In some embodiments as shown in FIGS. 18-19, the ejection springs may be spring probes 184 configured to establish electrical communication with a component of the mounting bracket (e.g., at least one battery). Electrical communication between the housing 110 and the mounting bracket 118 may be desirable, for example, in embodiments wherein the battery compartment is disposed on the mounting bracket 118 (as shown in the embodiment of FIG. 3). In some such embodiments, placement of the battery compartment on the mounting bracket rather than the housing may reduce a weight of the housing and facilitate replacement of a battery or batteries. For example, a user need not hold the housing 110 while replacing a battery. The housing 110 may instead be placed safely aside after removal, thereby reducing the risk of dropping or damaging the housing. Additionally in some embodiments, reducing the weight of the housing via placement of batteries in the mounting bracket 118 may reduce the risk of dropping or damaging the housing while manipulating the housing to attach the housing to the mounting bracket. Of course, in other embodiments, any suitable battery placement may be employed, including placing batteries in a housing, as the present disclosure is not so limited.

In some embodiments as shown in FIGS. 18-19, each spring probe 184 may include a cylindrical portion having a tip portion 190 and a collar 188 at opposing ends of the cylindrical portion. Each spring probe 184 may have a compression spring 192 at least partially contained within the cylindrical portion. Each spring probe 184 may be installed in the housing 110 and may establish electrical communication with a housing electrical contact 196. Each spring probe 184 may be disposed within a spring probe through-hole 198 in the housing 110. The compression spring 192 may urge the spring probe 184 forward, as shown in FIG. 18. The forward movement of the spring probe 184 may be limited by the collar 188, which may have a diameter that is greater than a diameter of the spring probe through-hole 198, thereby preventing extension of the spring probe 184 beyond a point at which the collar 188 is in contact with the spring probe through-hole 198.

A spring probe 184 on the housing 110 may serve as an electrical contact of the housing to establish electrical communication with a corresponding electrical contact of the mounting bracket 118. In this way, the at least one housing electrical contact (i.e., the spring probe 184 or other electrical contact) may be configured to contact at least one mounting bracket electrical contact when the first latch is engaged with the first catch such that the housing 110 is installed on the mounting bracket 118.

The example of FIG. 19 shows a housing 110 installed on a mounting bracket 118, with only the battery terminals 142 and the second latch 228 of the mounting bracket 118 shown to illustrate the function of the battery terminals 142 with respect to the spring probes 184 when the housing 110 is installed on the mounting bracket 118. In this arrangement, the spring probes 184 are configured to establish electrical communication with the battery terminals 142 of the mounting bracket 118. The battery terminals 142 may be configured to contact the spring probes 184 and compress the compression springs 192 when the housing 110 is installed on the mounting bracket 118.

It will be appreciated that compressing the compression springs 192 may create a spring force that may physically bias the housing 110 away from the mounting bracket 118 when the second latch 228 is moved to the disengaged position. In this way, the spring probes 184 facilitate the process of removing the housing 110 from the mounting bracket 118, while additionally establishing electrical communication between a housing electrical contact 196 and a mounting bracket electrical contact or battery terminal 142.

Figure 20:
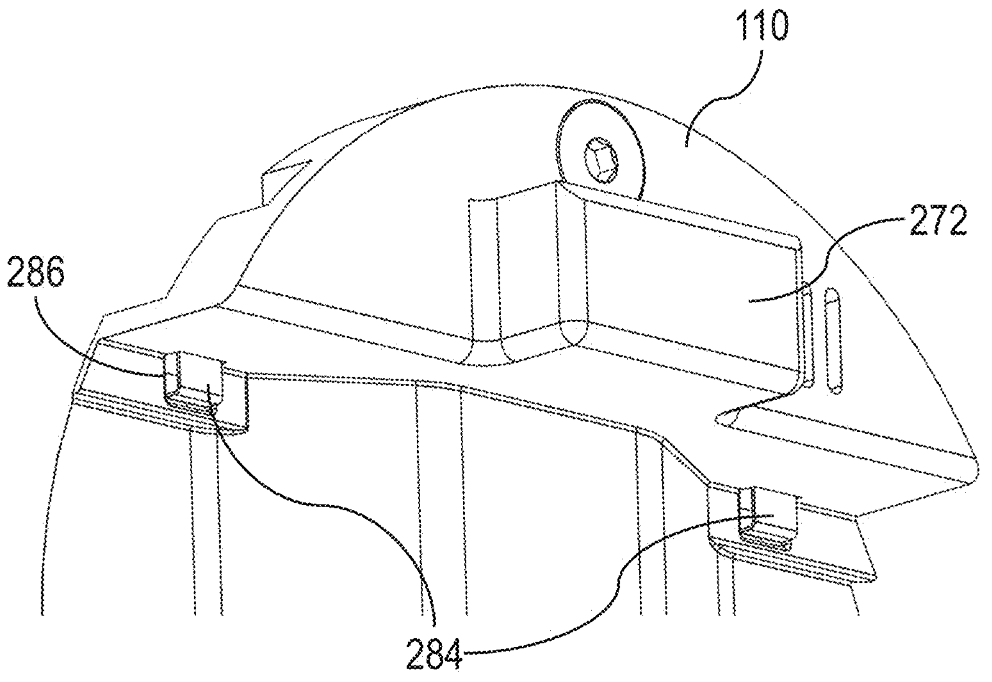
FIG. 20 is a rear perspective view of a second end portion of a second embodiment of a door lock system with outer structures removed.
Figure 21:
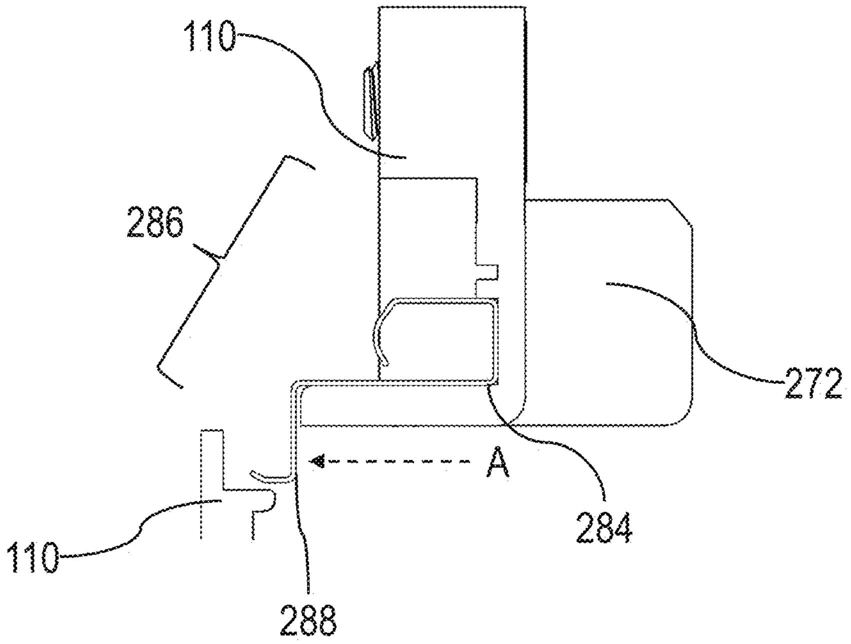
FIG. 21 is a cross-sectional side view of a second end portion of a second embodiment of a door lock system with outer structures removed.
Figure 22:
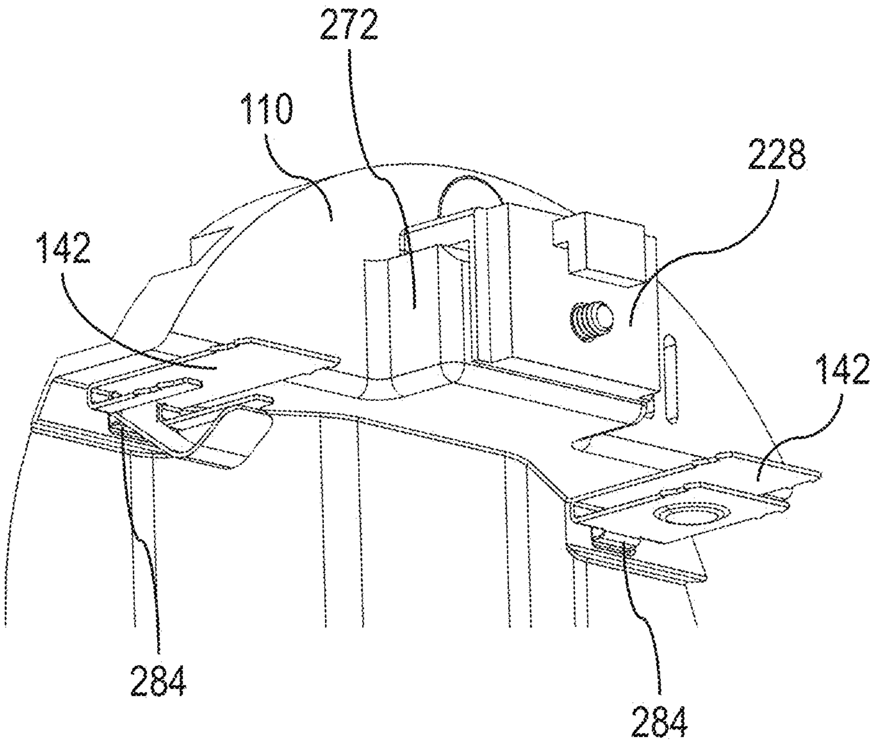
FIG. 22 is a rear perspective view of a second end portion of a second embodiment of a door lock system with a housing secured to a mounting bracket and with outer structures removed.

In other embodiments and as shown in FIGS. 20-22, the one or more ejection springs may be one or more spring contacts 284. In such embodiments, the spring contacts 284 may be installed in a spring contact cavity 286 of the housing 110. As shown in FIG. 21, the spring contact 284 may have a free end 288 that may be pressed further into the spring contact cavity 286 in order to generate a reactive spring force. For example, the spring contact 284 of FIG. 21 may be pressed in the direction of arrow A in order to generate a spring force in the opposite direction of arrow A.

When the housing 110 is installed on the mounting bracket 118, the battery terminals 142 of the mounting bracket 118 may press the free ends 288 of the spring contacts 284 further into the spring contact cavities 286. The example of FIG. 22 shows a housing 110 installed on a mounting bracket 118, with only the battery terminals 142 and the second latch 228 of the mounting bracket 118 shown to illustrate the function of the battery terminals 142 with respect to the spring contacts 284 when the housing 110 is installed on the mounting bracket 118. In this arrangement, the spring contacts 284 are configured to establish electrical communication with the battery terminals 142 of the mounting bracket 118.

It will be appreciated that the reactive spring force in the opposite direction of arrow A (FIG. 21) that is generated by this configuration may bias the housing 110 away from the mounting bracket 118 when the second latch 228 is moved to the disengaged position. In this way, the spring contacts 284 facilitate the process of removing the housing 110 from the mounting bracket 118, while additionally establishing electrical communication between a housing electrical contact and a mounting bracket electrical contact.

Figure 23:
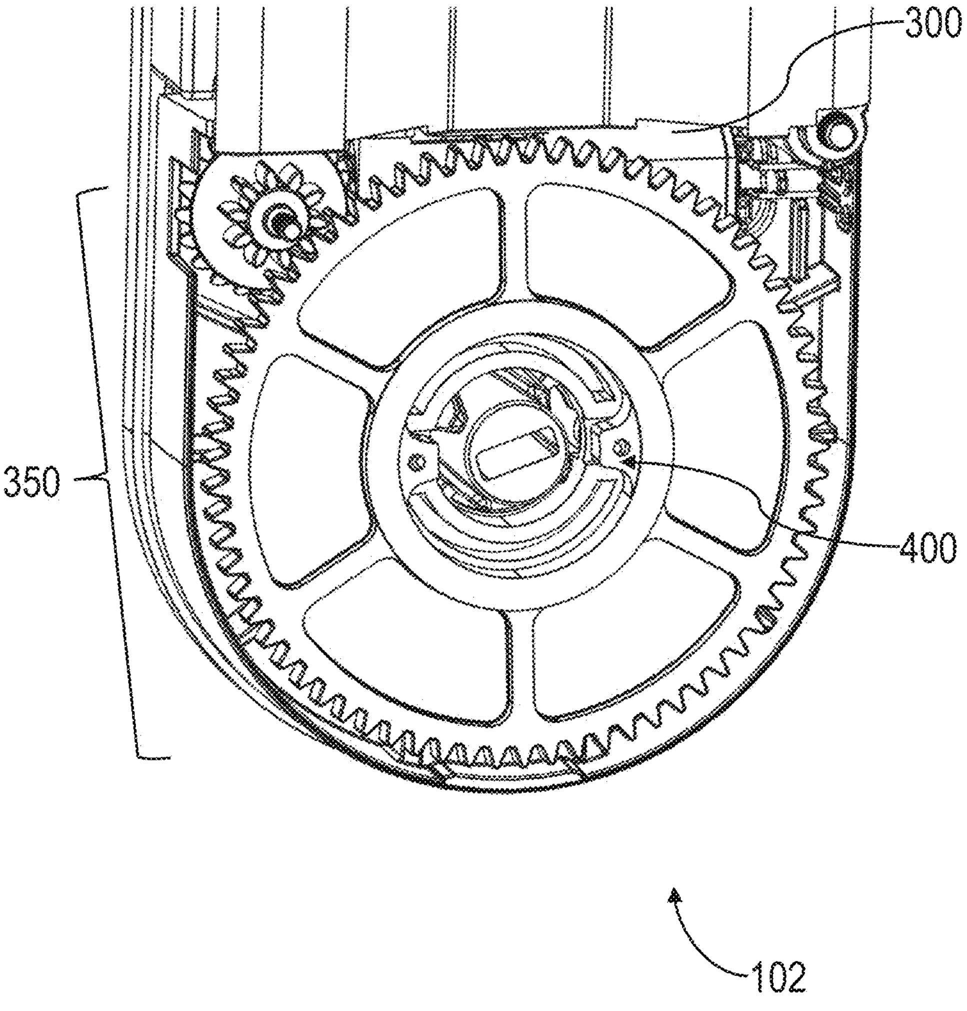
FIG. 23 is a front perspective view of a first end portion of one embodiment of a door lock system with outer structures removed.
Figure 24:
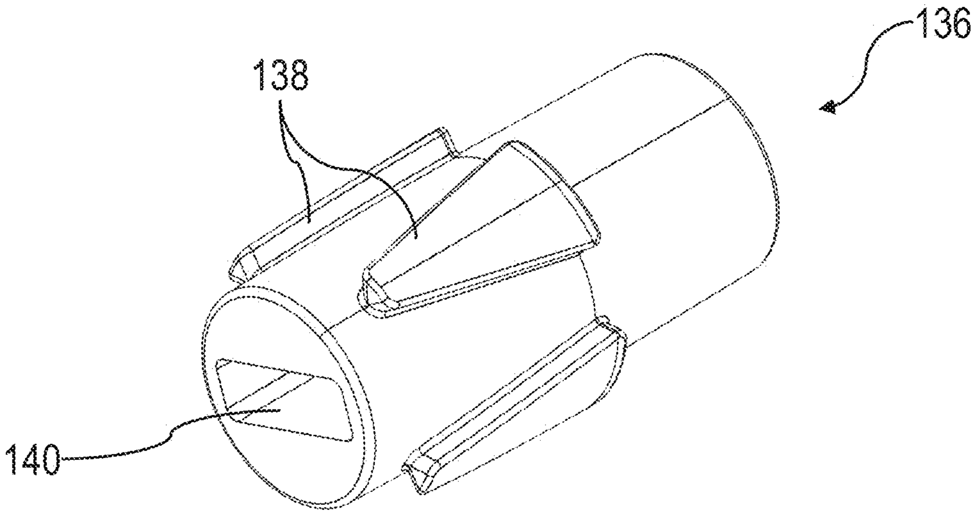
FIG. 24 is a front perspective view of an adapter of one embodiment of a door lock system.

As shown in FIG. 23, the first end portion 102 of the housing 110 includes a motor 300, a gear assembly 350, and a lock turn assembly 400. The motor 300 may be operably linked to the gear assembly 350 by a rotating shaft (not shown). The gear assembly 350 may be operably linked to the lock turn assembly 400. The lock turn assembly 400 may include a removable adapter 136. As shown in FIG. 24, the adapter 136 may have a cylindrical shape with a central channel 140. The adapter 136 may have stops 138 that allow the adapter 136 to be removably inserted into the lock turn assembly 400 up to a predetermined depth. The stops may be configured to cooperate with the adapter protrusions 174 (shown in FIG. 13) of the lock turn assembly 400 to facilitate rotation of the adapter 136. The central channel 140 of the adapter 136 may be configured to operatively couple the adapter to a deadbolt lock set, including a pre-existing deadbolt lock to allow for retrofitting applications. In some embodiments, a pre-existing deadbolt lock may be a manually operated deadbolt lock. Portions of the pre-existing deadbolt lock, including a housing, a thumb turn, or a cylinder may be removed to allow portions of an electromechanical deadbolt lock as described herein to cooperate with a portion or portions of the pre-existing deadbolt lock that may remain in the door. While the central channel 140 is illustrated as having a substantially rectangular geometry, it should be appreciated that the central channel 140 may be formed as any appropriate geometry that may be suitable for cooperating with a deadbolt lock set, including any pre-existing deadbolt lock in retrofitting applications. The ease with which a first adapter 136 may be removed and replaced with a second adapter 136 by virtue of the cooperation between stops 138 and adapter protrusions 174 may allow a user to quickly and easily change an adapter to fit a particular pre-existing deadbolt lock.

According to the embodiment of FIG. 23, the gear assembly 350, the lock turn assembly 400, and the adapter 136 may enable the motor 300 to extend and retract a bolt of the deadbolt lock set or the pre-existing deadbolt lock (not shown). Operation of the motor 300 may turn a rotating shaft to actuate the gear assembly 350 and cause the lock turn assembly 400 to extend or retract the bolt via the adapter 136. The lock turn assembly 400 may also include a handle 106 on the exterior of the housing 110, as shown in FIG. 1, to allow manual extension or retraction of the bolt. The handle 106 may be coupled with the gear assembly 350 and the adapter 136, such that the lock turn assembly 400 may be operated either manually via the handle 106 or electromechanically via the motor 300.

Figure 25:
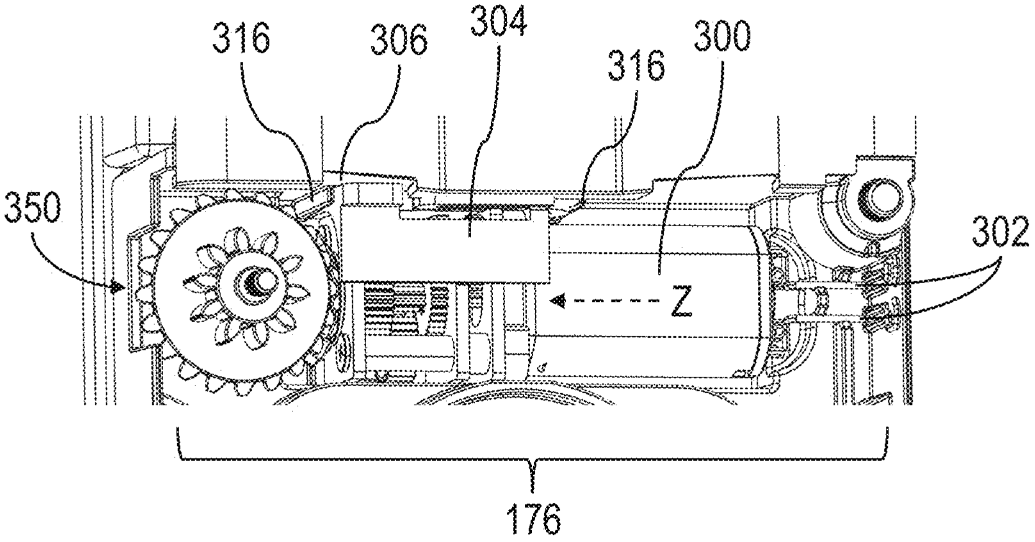
FIG. 25 is a front perspective view of a first end portion of one embodiment of a door lock system with outer structures removed to show a motor assembly.
Figure 26:
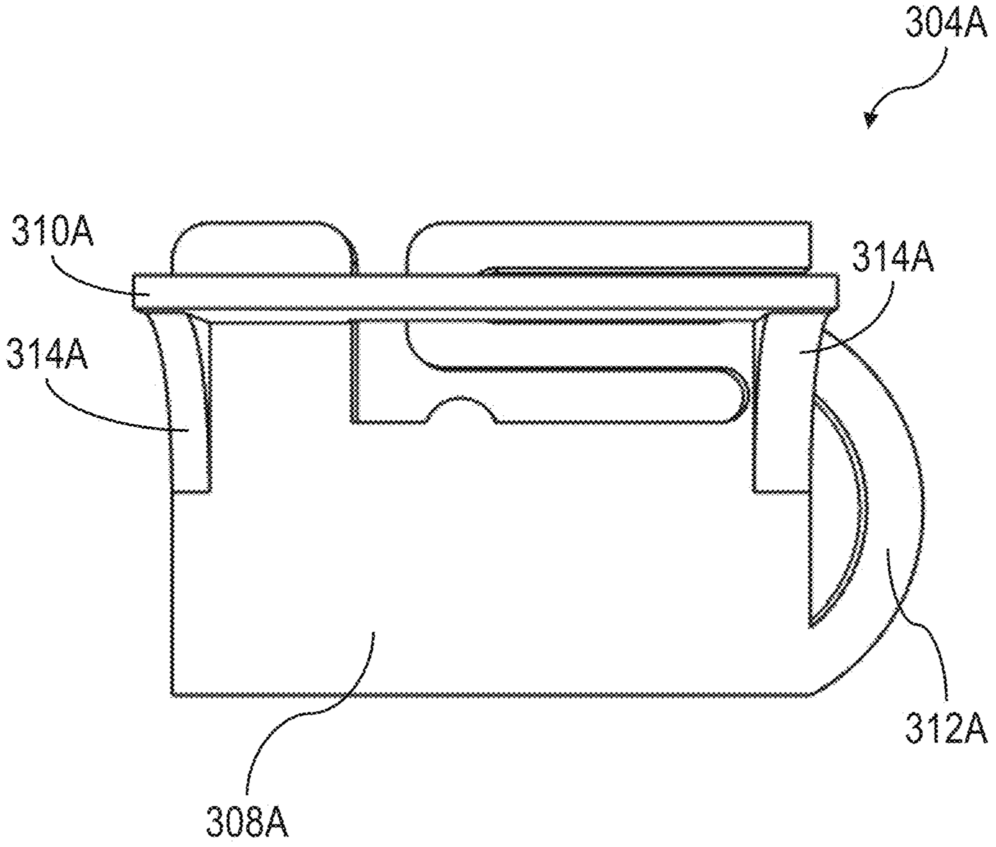
FIG. 26 is a front view of a first embodiment of a bracket of a door lock system.
Figure 27:
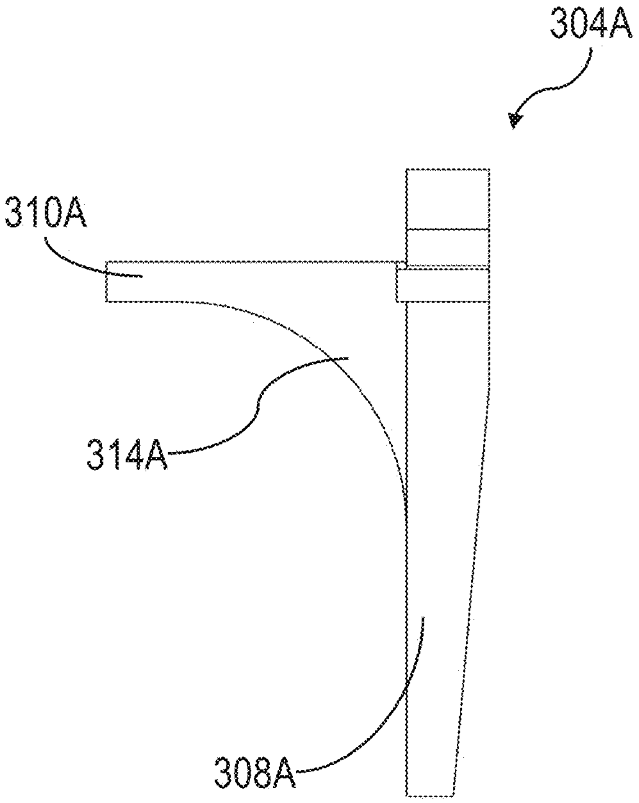
FIG. 27 is a side view of a first embodiment of a bracket of a door lock system.

The motor 300 may be installed in a motor compartment 176 of the housing 110, as shown in FIG. 25. The motor 300 may have one or more power terminals 302 that may be in electrical communication with a power source of the door lock system 100. For example, the power terminals 302 may be in electrical communication with one or more batteries in the battery compartment 134.

Figure 30:
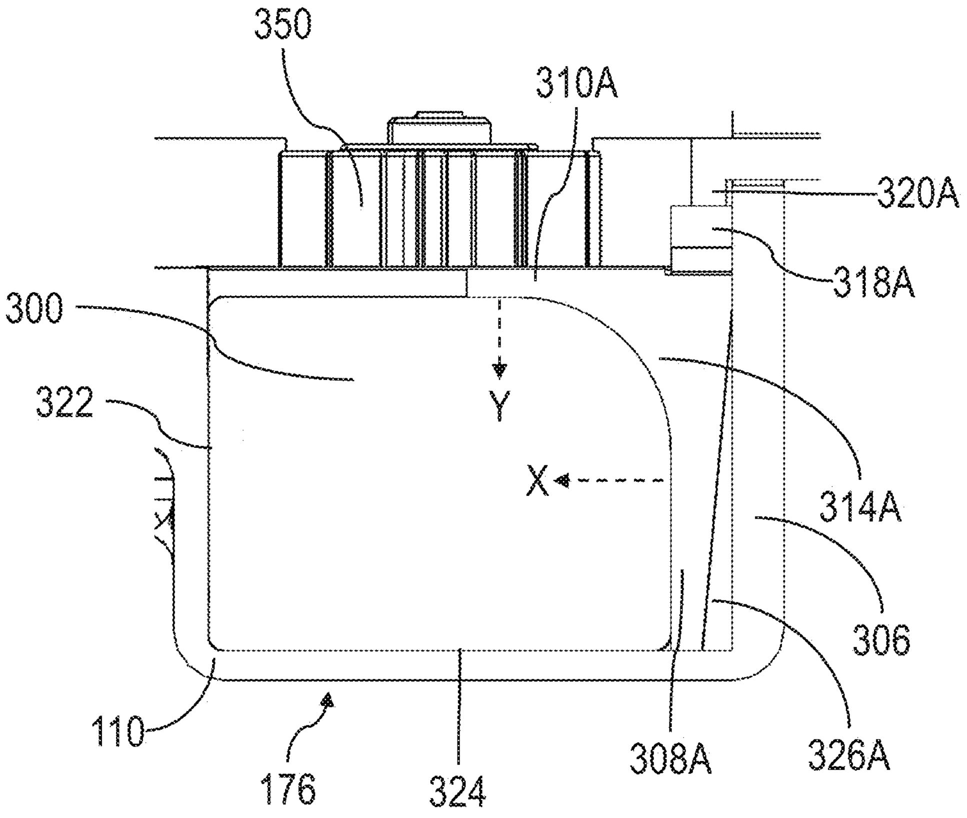
FIG. 30 is a cross-sectional side view of a first embodiment of a bracket of a door lock system installed in the door lock system.
Figure 31:
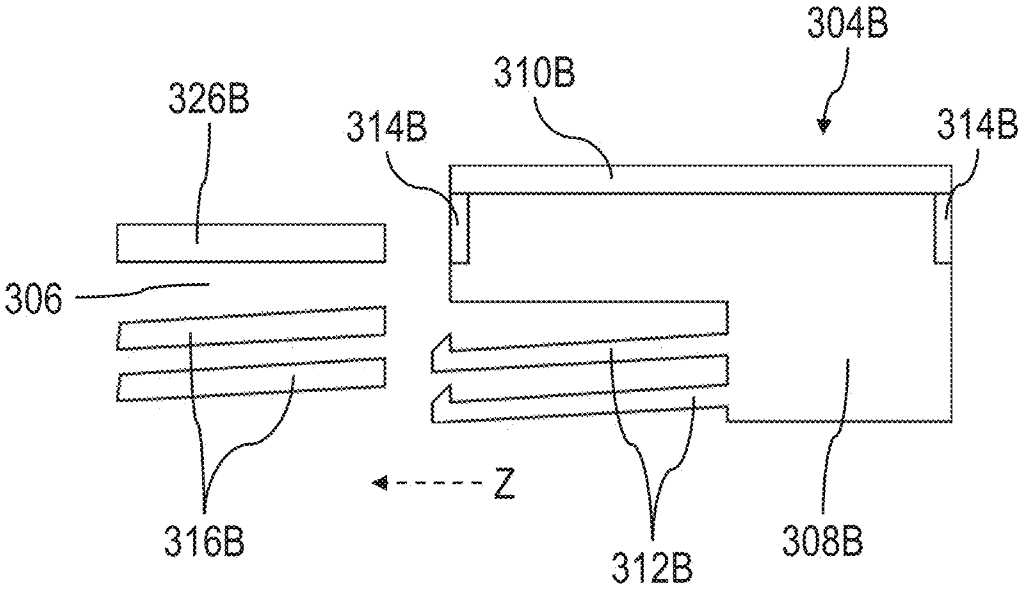
FIG. 31 is a bottom view of a second embodiment of a bracket of a door lock system during installation of the bracket in the door lock system.
Figure 32:
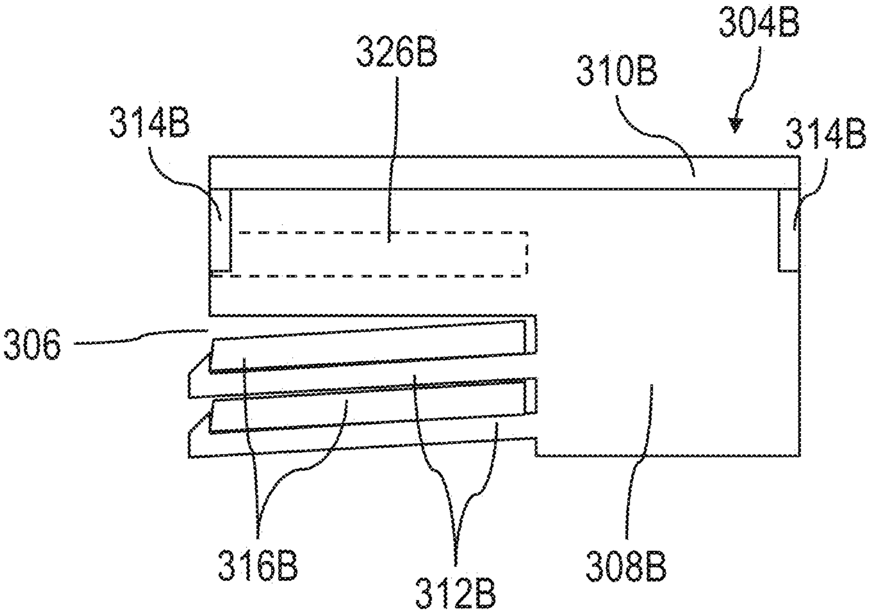
FIG. 32 is a bottom view of a second embodiment of a bracket of a door lock system following installation of the bracket in the door lock system.
Figure 33:
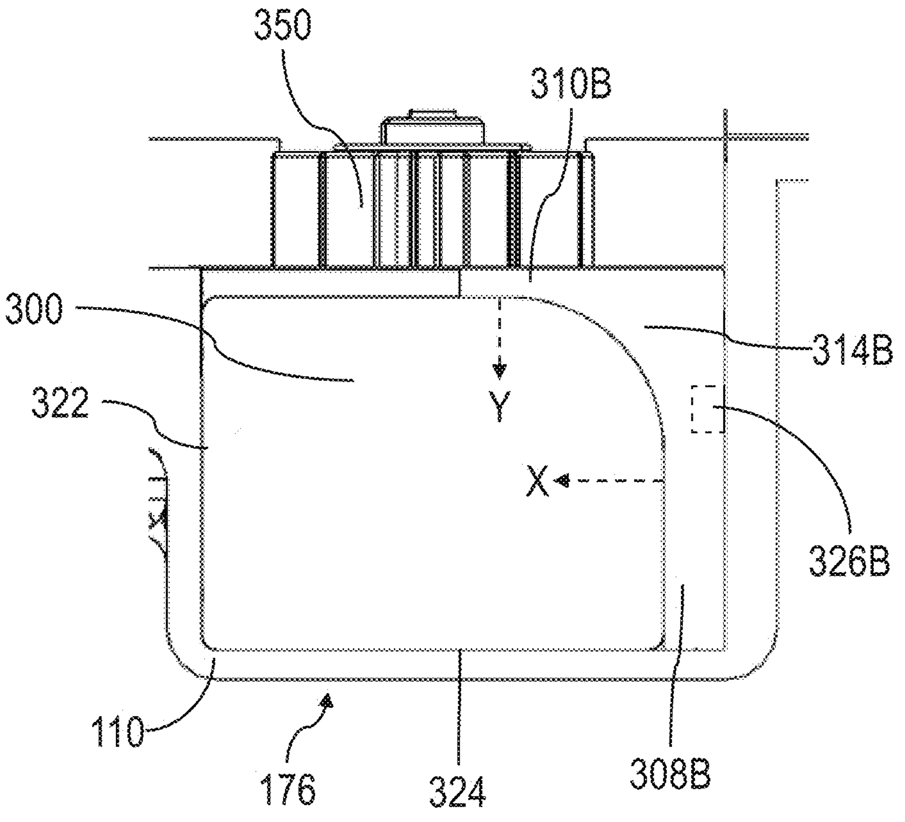
FIG. 33 is a cross-sectional side view of a second embodiment of a bracket of a door lock system installed in the door lock system.

The motor 300 may be secured in the housing using a bracket 304 (e.g., a motor bracket). The bracket 304 may be placed between the motor 300 and a wall 306 of the housing 110. A bracket 304 may be any suitable material with appropriate rigidity and durability, including any appropriate plastic or metal materials. Appropriate materials will be sufficiently rigid to prevent movement of the motor and will tolerate a degree of elastic deformation to facilitate engagement with the housing. In some embodiments, the components of the bracket are integrally formed (e.g., cast, molded, extruded, printed, etc.). A first embodiment of the bracket 304A is shown in FIGS. 26-30, and a second embodiment of a bracket 304B is shown in FIGS. 31-33. As shown in FIGS. 26-33, both embodiments of brackets 304A, 304B include a base 308A, 308B having a first side and a second side. A base may a rectangular body, or it may have any other appropriate geometry configured to be retained in the housing 110. A shelf 310A, 310B of both brackets may extend from the first side of the base 308A, 308B (e.g., in a direction perpendicular to a plane of the base). As shown in FIGS. 26-33, the shelf may extend along an entire length of the base, though in other embodiments a shelf may extend along any length of the base. The shelf 310A, 310B and the first side of the base 308A, 308B are configured to engage the motor 300. A shelf may be configured to engage a motor by being formed in a shape that complements or corresponds to a shape of the motor, thereby allowing at least a portion of the shelf to contact at least a portion of the motor. The base 308A, 308B may further include at least one retainer 312A, 312B configured to engage at least one protrusion of the housing (e.g., a vertical housing protrusion 316). The retainer may be an elongated tab extending from the base, and the retainer may be configured to elastically deform in response to a force applied to the retainer. A retainer may be configured to facilitate a snap fit, a press fit or any other type of engagement with the housing 110. A protrusion of the housing may be integrally formed with the housing or with a wall of the housing, and may protrude therefrom in such a way as to cause a retainer of the bracket to deform when the bracket is moved along the housing or the wall of the housing. In some embodiments, the retainer of a bracket may be configured to engage a protrusion of the housing when a bracket slides against the housing (e.g., in an insertion direction). The brackets 304A, 304B also include at least one ramp 314A, 314B extending from the first side of the base. A ramp may be a structure within a corner between the base and the shelf. A ramp may form a rounded or sloped corner between the base and the shelf. A ramp may form a corner that is shaped to match a curvature or geometry of a motor, such that at least a portion of the ramp may contact at least a portion of the motor. A bracket may include a plurality of ramps, a single ramp, or no ramps (i.e., the corner between the base and the shelf may form an angle with no rounding or modification from a ramp). The at least one ramp 314A, 314B may be configured to apply force to the motor when the bracket is moved relative to the housing in a first direction. The base 308A, 308B, the at least one shelf 310A, 310B, and the at least one retainer 312A, 312B may be integrally molded as a single component, or they may be formed as separate components which may be assembled together to form the bracket 304A, 304B.

Figure 28:
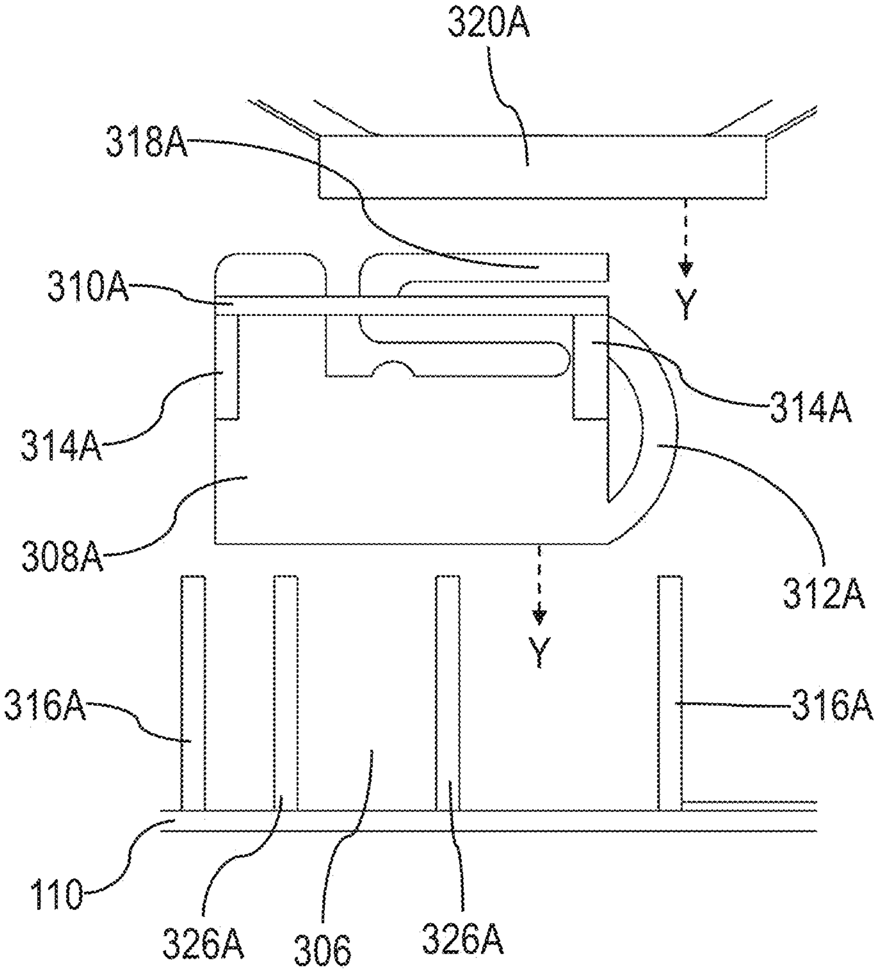
FIG. 28 is a bottom view of a first embodiment of a bracket of a door lock system during installation of the bracket in the door lock system.
Figure 29:
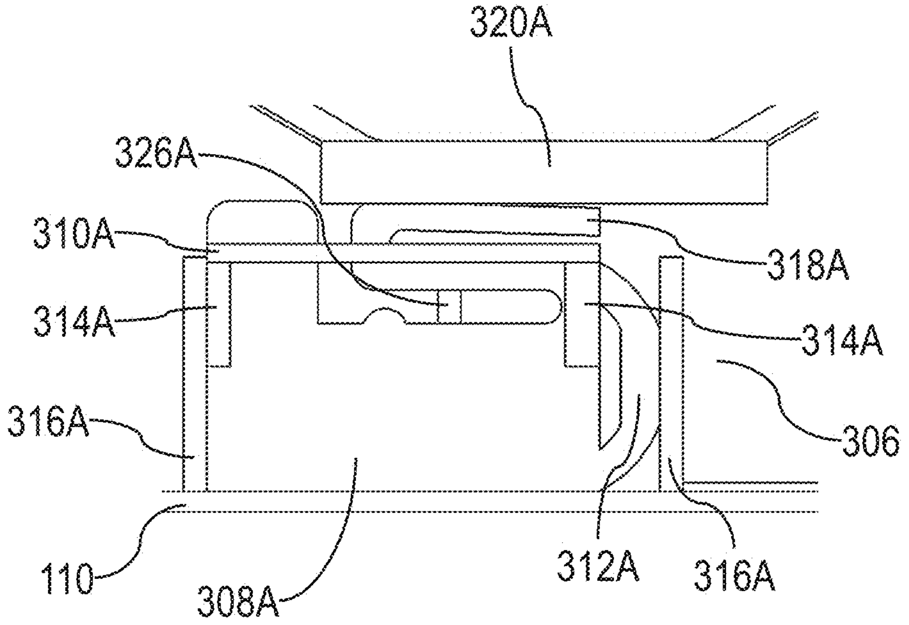
FIG. 29 is a bottom view of a first embodiment of a bracket of a door lock system following installation of the bracket in the door lock system.

In the embodiment of the bracket 304A as shown in FIGS. 26-30, the bracket 304A may be configured to slide along the wall 306 between the vertical housing protrusions 316A in the direction indicated by arrow Y in FIG. 28. A first retainer 312A may be configured to move from a disengaged position (shown in FIG. 28) to an engaged position (shown in FIG. 29) by elastically deforming in response to a compressive force resulting from the base 308A sliding between the vertical housing protrusions 316A. When the first retainer 312A engages the protrusion 316A in the engaged position, the engagement between the retainer 312A and the protrusion 316A may secure the bracket 304A within the housing 110. The elastic deformation of the first retainer 312A may result in a press-fit with the vertical housing protrusions 316A. The wall 306 of the housing 110 may include one or more wedges 326A configured to urge the base 308A away from the wall 306 as the base 308A slides in the direction Y along the wall 306.

In the embodiment of FIGS. 26-30, the bracket 304A also includes a second retainer 318A. The second retainer 318A is configured to move from a disengaged position to an engaged position by elastically deforming in response to a compressive force resulting from a horizontal housing protrusion 320A being pressed in the direction Y against the second retainer 318A when the base 308A is slid between the vertical housing protrusions 316A. The elastic deformation of the second retainer 318A may result in a press-fit with the horizontal housing protrusion 320A.

When the first retainer 312A is engaged with the vertical housing protrusion 316A, the bracket 304A may apply force to the motor 300 to secure it within the housing 110. For example, and as shown in FIG. 30, when the bracket 304A is moved relative to the housing 110 in a first direction indicated by arrow Y, the bracket 304A may apply force in the first direction Y to secure the motor against a first surface 324 of the housing 110 and a second direction indicated by arrow X to secure the motor against a second surface 322 of the housing 110. The second direction X may be perpendicular to the first direction Y. Each of the first direction Y and the second direction X may be perpendicular to a shaft direction Z of the motor 300, the shaft direction Z being shown in FIG. 25. The force may be applied to the motor 300 by the at least one ramp 314A. As a result of the forces applied by the bracket, the bracket 304A may inhibit a rotational movement of the motor.

In another embodiment of the bracket 304B shown in FIGS. 31-33, the bracket 304B may be configured to slide along the wall 306 in the shaft direction Z. At least one retainer 312B may be configured to move from a disengaged position (shown in FIG. 31) to an engaged position (shown in FIG. 32) by elastically deforming in response the retainer 312B sliding along a housing protrusion 316B as the base 308B slides along the wall 306. The bracket 304B may include a first retainer 312B and a second retainer 312B configured to engage a pair of housing protrusions 316B via a snap engagement. That is, the first retainer and second retainers may include a tooth configured to engage the housing protrusions 316B. When the retainers 312B are in the engaged position, the engagement may secure the bracket 304B within the housing 110. The wall 306 of the housing 110 may include one or more wedges 326B configured to urge the base 308B away from the wall 306 as the base 308B slides in the direction Z along the wall 306.

As shown in FIG. 33, when the retainers 312B are engaged with the housing protrusions 316B, the bracket 304B may apply force to the motor 300 to secure it within the housing 110. For example, when the bracket 304B is moved relative to the housing 110 in the direction Z, the bracket 304A may apply force in a first direction Y to secure the motor against a first surface 324 of the housing 110 and a second direction X to secure the motor against a second surface 322 of the housing 110. The second direction X may be perpendicular to the first direction Y. Each of the first direction Y and the second direction X may be perpendicular to the shaft direction Z. The force may be applied to the motor 300 by the at least one ramp 314B. The retainers 312B of the bracket may also inhibit movement of the motor in the shaft direction Z. As a result of the force applied, the bracket 304B may inhibit a rotational movement of the motor.

Figure 34:
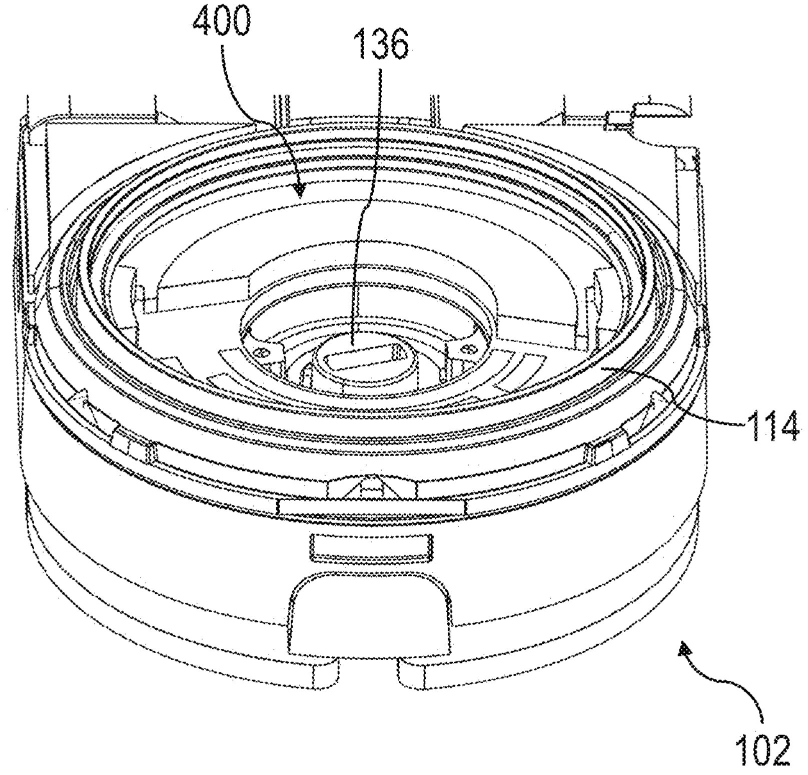
FIG. 34 is a bottom perspective view of a housing of one embodiment of a door lock system with a cover and a thumb turn removed to show a thumb turn support assembly.
Figure 35:
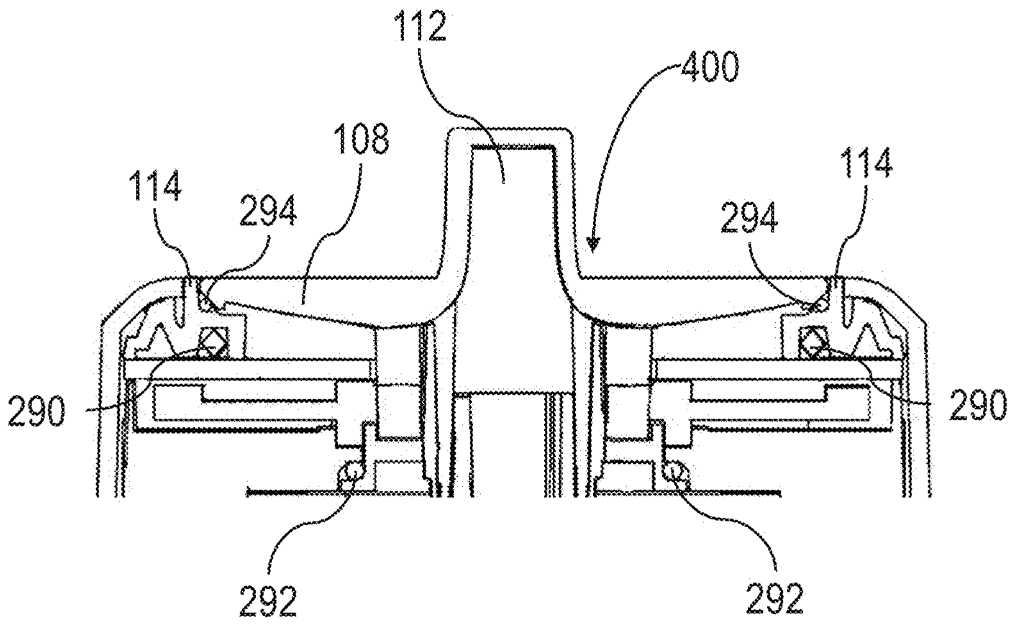
FIG. 35 is a bottom cross-sectional view of a housing of one embodiment of a door lock system taken along line 35-35 of FIG. 1 with a cover and a thumb turn removed to show a thumb turn support assembly.

FIG. 34 shows the first end portion 102 of a door lock system 100 with portions of the structure removed to show the placement of the outer ring 114. In some embodiments as shown in FIG. 34, the outer ring 114 is disposed near a circumference the lock turn assembly 400. A surface of the outer ring 114 may extend through the housing 110 to be exposed to the environment when the door lock system 100 is assembled. The outer ring 114 may be a light ring to provide illumination to the door lock system 100 during operation. As shown in FIG. 35, some embodiments of the outer ring 114, including light rings, may have a cross-sectional geometry that is suitable for containing light-emitting diodes (LEDs) 290. The outer ring 114 may be formed as a single-piece plastic molding, and may be formed from a translucent, transparent, semi-translucent or semi-transparent material so that light from the LEDs 290 may be transmitted through the outer ring 114 to the outside environment in order to illuminate the door lock system 100. In some embodiments, the outer ring may function as a diffuser configured to diffuse light from the LEDs 290 to provide approximately uniform illumination around a circumference of the outer ring. Exemplary materials for a light ring may include polycarbonate with a titanium dioxide content of about 0.3%-0.5%.

In some embodiments as shown in FIG. 35, o-rings may be used within the lock turn assembly 400 in order to stabilize the lock turn assembly 400 or a component thereof (e.g., the thumb turn 112) during operation of the door lock system 100, as well as to facilitate a sliding interface between the lock turn assembly and a housing of a door lock system. The embodiment of FIG. 35 illustrates a first o-ring 292 and a second o-ring 294 disposed in the lock turn assembly 400. The first o-ring 292 may provide a sliding interface between a portion of the lock turn assembly 400 or thumb turn 112 and may provide stability during operation of the lock turn assembly 400 or thumb turn 112. The second o-ring 294 may support a portion of the thumb turn 112, for example the circular portion 108, which may be cantilevered from a central portion of the lock turn assembly 400. The o-rings may be formed from a compliant material which may allow for smooth motion of the lock turn assembly 400. Suitable materials may include a rubber coated with polytetrafluoroethylene (PTFE) or a similar material with an appropriate durometer and surface friction characteristics.

Figure 36:
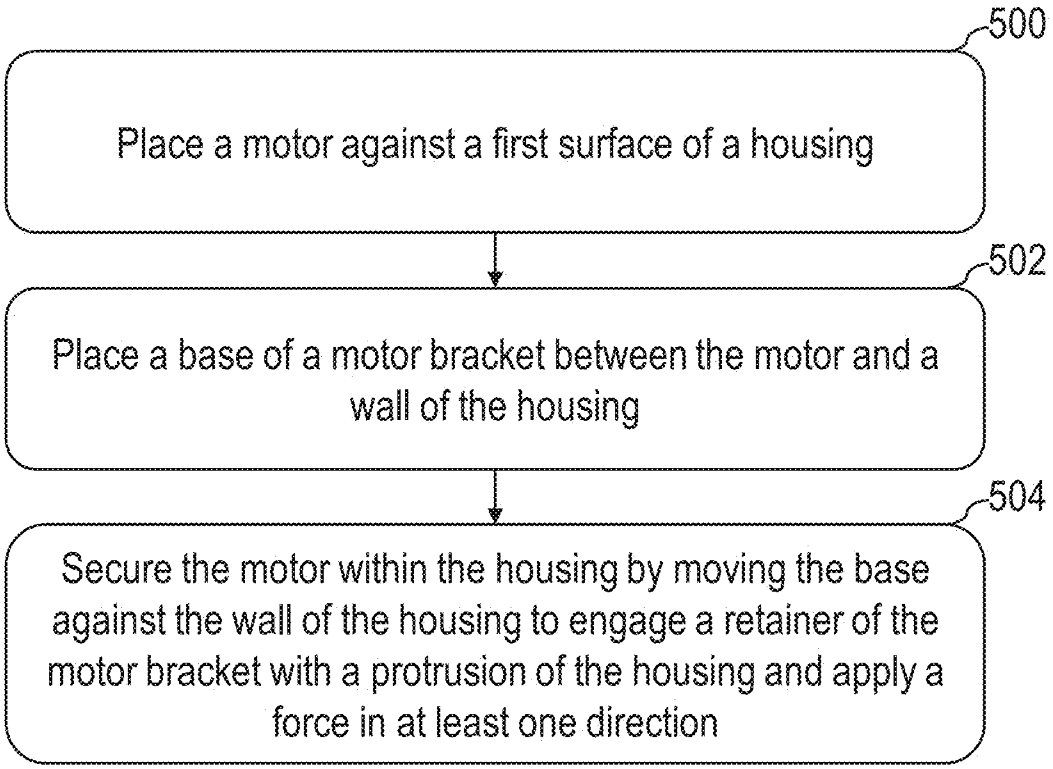
FIG. 36 is a flow chart showing a method of manufacturing a door lock system.

FIG. 36 illustrates a process diagram embodying a method for manufacturing a door lock system. In block 500, a motor is placed against a first surface of a housing. In block 502, a base of a bracket is placed between the motor and a wall of the housing. In block 504, the motor is secured within the housing by moving the base of the bracket against the wall of the housing to engage a retainer of the motor bracket with a protrusion of the housing and applying a force in at least one direction. In some embodiments, securing the motor to apply a force in at least one direction in block 504 may include securing the motor to apply a force in a first direction to secure the motor against the first surface of the housing and securing the motor to apply a force in a second direction to secure the motor against a second surface of the housing. In some embodiments, the second direction may be perpendicular to the first direction. In some embodiments, the first direction and the second direction may be mutually perpendicular to a shaft direction of the motor.

In other embodiments of the method of FIG. 36, applying force in the at least one direction to the motor in block 504 may include applying force in a first direction to secure the motor against the first surface of the housing, applying force in a second direction to secure the motor against a second surface of the housing, and applying force in a third direction to secure the motor against a third surface of the housing. In other embodiments, applying force to the motor further may include inhibiting rotational movement of the motor.

In further embodiments, placing the base of the bracket between the motor and the wall of the housing in block 502 may include placing at least one ramp of the bracket between the motor and the wall of the housing, and the at least one ramp may extend from the base of the bracket. In some embodiments, the at least one ramp may be configured to slidably engage the motor. In still further embodiments, applying force in the at least one direction to the motor may include applying force with the at least one ramp of the bracket.

In other embodiments, moving the base against the wall of the housing to engage the retainer of the bracket with the protrusion of the housing in block 504 may further include elastically deforming the retainer to engage the retainer with the protrusion. In some such embodiments, the retainer may be configured to form a press-fit with the protrusion.

Figure 37:
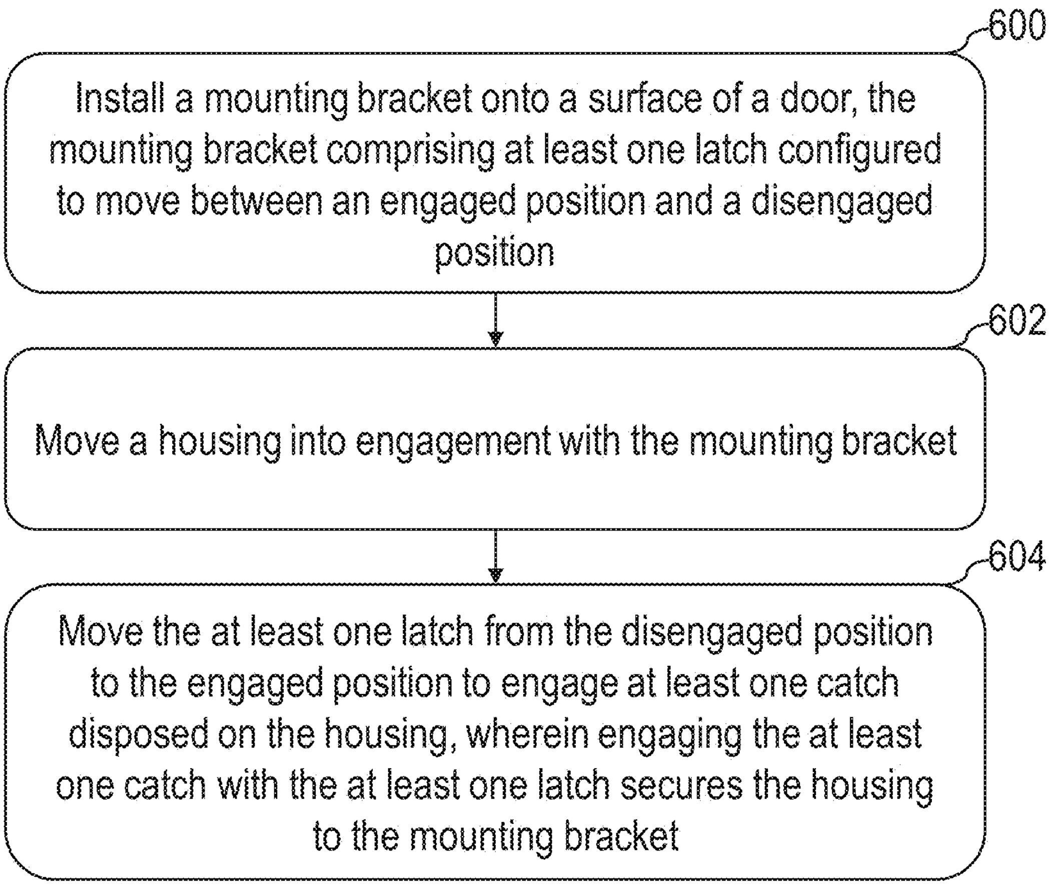
FIG. 37 is a flow chart showing a method of assembling a door lock system.

FIG. 37 illustrates a process diagram embodying a method for assembling a door lock system. In block 600, a mounting bracket is installed onto a surface of a door. The mounting bracket includes at least one latch configured to move between an engaged position and a disengaged position. In block 602, a housing is moved into engagement with the mounting bracket. In block 604, the at least one latch is moved from the disengaged position to the engaged position to engage at least one catch disposed on the housing. Engaging the at least one catch with the at least one latch secures the housing to the mounting bracket.

In some embodiments of the method of FIG. 37, moving the at least one latch from the disengaged position to the engaged position may include using a spring configured to bias the at least one latch toward the engaged position in response to moving the housing into engagement with the mounting bracket. In other embodiments, moving the housing into engagement with the mounting bracket may include moving the housing in a direction that is perpendicular to the surface of the door. In further embodiments, moving the at least one latch from the disengaged position to the engaged position to engage at least one catch disposed on the housing may include moving a first latch to the engaged position to engage a first catch disposed on the housing and moving a second latch to the engaged position to engage a second catch disposed on the housing. In some such embodiments, moving a second latch to the engaged position may include moving a rigid link configured to connect the first latch and the second latch such that the first latch and the second latch move together between the engaged position and the disengaged position.

In still further embodiments, the mounting bracket may further include a spring configured to bias the first latch toward the engaged position, and the spring may be configured to bias the second latch toward the engaged position via the rigid link. In some embodiments, moving a first latch to the engaged position and moving a second latch to the engaged position may occur in response to moving the housing into engagement with the mounting bracket in a direction that is perpendicular to the surface of the door. In other embodiments, moving the at least one latch from the disengaged position to the engaged position may include actuating a button to move the at least one latch between the engaged position and the disengaged position. Some embodiments may further include moving a deadbolt between an extended position and a retracted position using a motor disposed in the housing.

Other embodiments may further include establishing electrical communication between at least one mounting bracket electrical contact disposed on the mounting bracket and at least one housing electrical contact disposed on the housing. In some such embodiments, establishing electrical communication between the at least one mounting bracket electrical contact and the at least one housing electrical contact may include establishing an electrical connection between one or more components disposed on the housing and a battery disposed on the mounting bracket. In other such embodiments, establishing electrical communication between the at least one mounting bracket electrical contact and the at least one housing electrical contact may include compressing an ejection spring operatively coupled to the at least one mounting bracket electrical contact and biasing the housing away from the mounting bracket with the ejection spring.

Other embodiments of the method of FIG. 37 may further include removing at least part of an existing lockset from the surface of the door prior to installing the mounting bracket onto the surface of the door. Some such embodiments may further include operatively coupling an adapter with a driveshaft of the door lock system prior to moving the housing into engagement with the mounting bracket, and the adapter may be configured to couple a tail piece of the existing lockset to the driveshaft. In some such embodiments, installing the mounting bracket onto the surface of the door may include mating the adapter with the tail piece of the existing deadbolt.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock system comprising:

a housing comprising:

a first end portion, a second end portion, and a first catch positioned at the first end portion; and a mounting bracket configured to be mounted on a surface of a door, the mounting bracket comprising:

a first latch movable between an engaged position and a disengaged position wherein the first latch is configured to engage the first catch in the engaged position to secure the housing to the mounting bracket when the housing is moved into engagement with the mounting bracket, a spring configured to bias the first latch toward the engaged position; and a thumb turn rotatably mounted to the housing, wherein the thumb turn comprises a compliant stabilizing ring configured to provide a sliding interface between the thumb turn and the housing.

2. The door lock system of claim 1, wherein the first latch is configured to engage the first catch when the housing is moved into engagement with the mounting bracket in a direction that is perpendicular to the surface of the door.

3. The door lock system of claim 1, wherein the housing further comprises a second catch positioned at the second end portion of the housing, and wherein the mounting bracket further comprises a second latch movable between an engaged position and a disengaged position, wherein the second latch is configured to engage the second catch in the engaged position to secure the housing to the mounting bracket.

4. The door lock system of claim 3, further comprising a rigid link connecting the first latch and the second latch such that the spring is configured to bias both the first latch and the second latch toward their respective engaged positions.

5. The door lock system of claim 1, wherein the first latch comprises a sloped surface configured to slide against a corresponding sloped surface of the first catch when moving between the engaged position and the disengaged position, and a latch engagement surface configured to contact a catch engagement surface of the first catch when the first latch is configured to engage the first catch.

6. The door lock system of claim 1, wherein the mounting bracket further comprises at least one mounting bracket electrical contact, wherein the housing further comprises at least one housing electrical contact, and wherein the at least one housing electrical contact is configured to contact the at least one mounting bracket electrical contact when the first latch is engaged with the first catch.

7. The door lock system of claim 6, wherein the mounting bracket further comprises a battery, wherein the at least one mounting bracket electrical contact and the at least one housing electrical contact are configured to provide an electrical connection between the battery and one or more components disposed on the housing.

8. The door lock system of claim 6, wherein the at least one mounting bracket electrical contact is a spring probe configured to physically bias the housing away from the mounting bracket.

9. The door lock system of claim 6, wherein the at least one mounting bracket electrical contact further comprises an ejection spring configured to physically bias the housing away from the mounting bracket.

10. The door lock system of claim 1, wherein the mounting bracket further comprises a button configured to be operable by a user to move the first latch from the engaged position to the disengaged position.

11. The door lock system of claim 10, wherein the spring is configured to apply a biasing force to the button to bias the first latch toward the engaged position.

12. The door lock system of claim 10, wherein the button is integral with the first latch.

13. The door lock system of claim 1, wherein the compliant stabilizing ring comprises a first o-ring.

14. The door lock system of claim 13, wherein a portion of the thumb turn is cantilevered within the housing, further comprising a second o-ring configured to provide a second sliding interface between the thumb turn and the housing and to support the cantilevered portion of the thumb turn.

15. A door lock system comprising:

a housing;

a mounting bracket configured to be mounted on a surface of a door, the mounting bracket comprising a latch configured to secure the housing to the mounting bracket; and a thumb turn rotatably mounted to the housing, wherein the thumb turn comprises a compliant stabilizing ring configured to provide a sliding interface between the thumb turn and the housing.

16. The door lock system of claim 15, wherein the compliant stabilizing ring comprises a first o-ring, wherein a portion of the thumb turn is cantilevered within the housing, the door lock system further comprising a second o-ring configured to provide a second sliding interface between the thumb turn and the housing and to support the cantilevered portion of the thumb turn.

17. The door lock system of claim 15, wherein the compliant stabilizing ring comprises a PTFE coated o-ring.

18. The door lock system of claim 15, wherein the latch is movable between an engaged position and a disengaged position wherein the latch is configured to engage a first catch of the housing in the engaged position to secure the housing to the mounting bracket when the housing is moved into engagement with the mounting bracket.

* * * * *